(12) United States Patent
Harel et al.

(10) Patent No.: US 11,515,650 B2
(45) Date of Patent: Nov. 29, 2022

(54) ANTENNA SYSTEM

(71) Applicant: Nokia Shanghai Bell Co., Ltd., Shanghai (CN)

(72) Inventors: Jeanpierre Harel, Lannion (FR); Jerome Plet, Louannec (FR); Zied Charaabi, Lannion (FR); Ronan Chaume, Cavan (FR)

(73) Assignee: Nokia Shanghai Bell Co., Ltd., Shanghai (CN)

( * ) Notice: Subject to any disclaimer, the term of this patent is extended or adjusted under 35 U.S.C. 154(b) by 0 days.

(21) Appl. No.: 17/332,240

(22) Filed: May 27, 2021

(65) Prior Publication Data

US 2021/0376492 A1    Dec. 2, 2021

(30) Foreign Application Priority Data

Jun. 1, 2020    (EP) .................................... 20177670

(51) Int. Cl.
| | |
|---|---|
| *H01Q 1/36* | (2006.01) |
| *H01Q 21/24* | (2006.01) |
| *H01Q 1/24* | (2006.01) |
| *H01Q 21/26* | (2006.01) |
| *H01Q 21/06* | (2006.01) |
| *H01Q 1/48* | (2006.01) |
| *G01S 13/42* | (2006.01) |

(52) U.S. Cl.
CPC ........... *H01Q 21/245* (2013.01); *H01Q 1/246* (2013.01); *H01Q 21/26* (2013.01); *G01S 13/426* (2013.01); *H01Q 1/48* (2013.01); *H01Q 21/062* (2013.01); *H01Q 21/24* (2013.01)

(58) Field of Classification Search
CPC ...... H01Q 21/245; H01Q 1/246; H01Q 21/26; H01Q 21/24; H01Q 1/48; G01S 13/426
See application file for complete search history.

(56) References Cited

U.S. PATENT DOCUMENTS

| | | |
|---|---|---|
| 2015/0263435 A1 | 9/2015 | Song et al. |
| 2016/0248166 A1 | 8/2016 | Moon et al. |
| 2019/0123426 A1 | 4/2019 | Bryce |
| 2019/0273315 A1 | 9/2019 | Hu et al. |
| 2021/0239791 A1* | 8/2021 | Vollbracht ............ G01S 13/931 |

* cited by examiner

*Primary Examiner* — Joseph J Lauture
(74) *Attorney, Agent, or Firm* — Harrington & Smith

(57) ABSTRACT

An antenna system including a first antenna, a second antenna and a third antenna. The antenna system includes a feed for feeding a first common signal to radiator elements of one of the second antenna or third, with a first phase difference between the radiator elements configured for a first polarization and the radiator elements being configured for a second polarization, to create a virtual polarization, wherein the virtual polarization is aligned with one of the first polarization or the second polarization in a first frequency band.

16 Claims, 13 Drawing Sheets

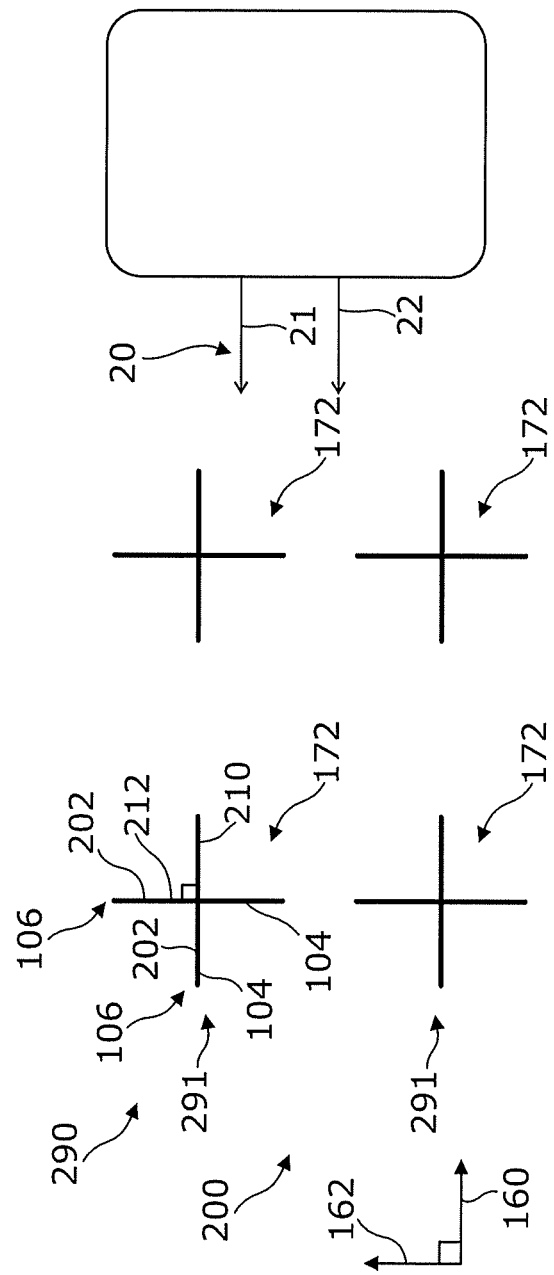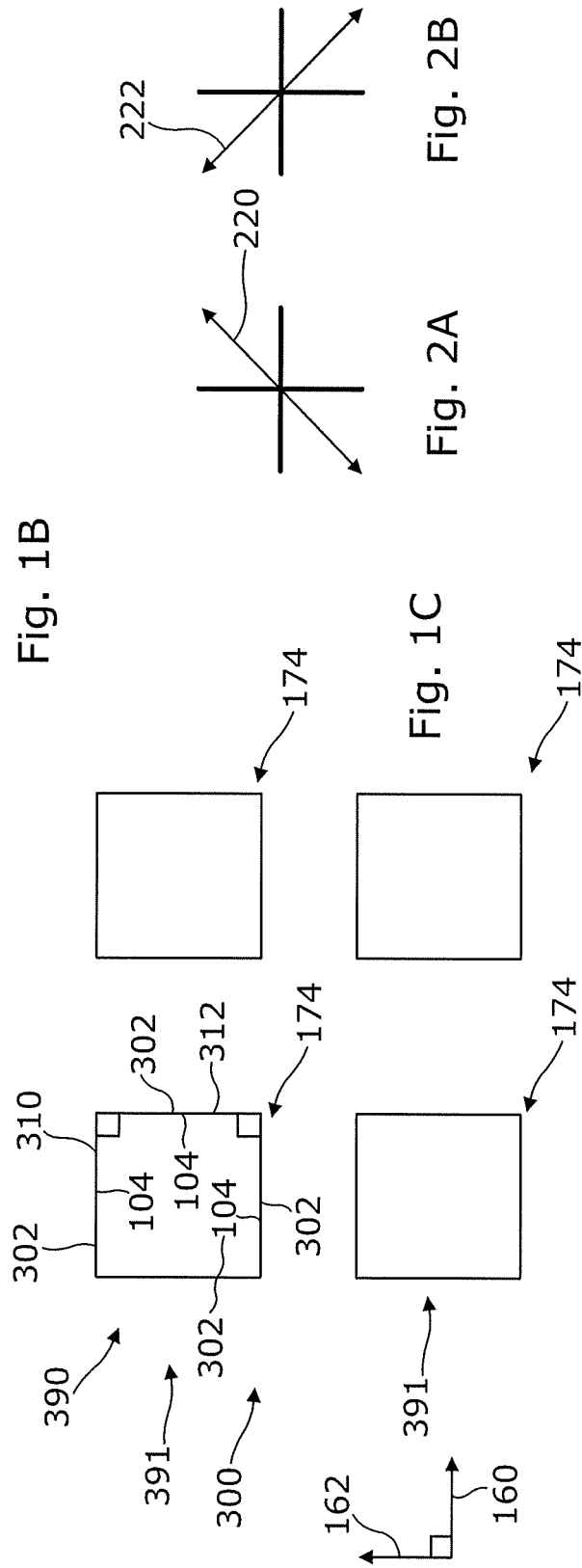

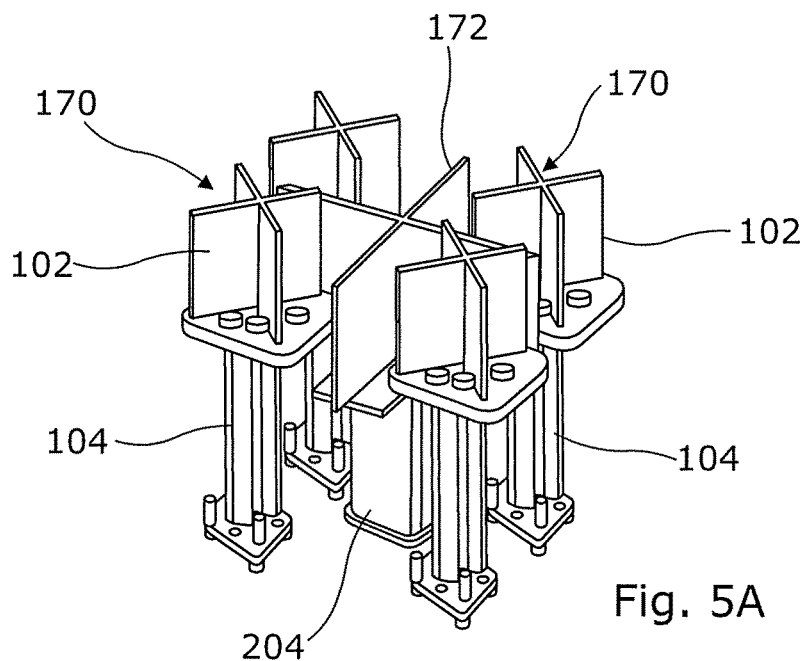
Fig. 5A
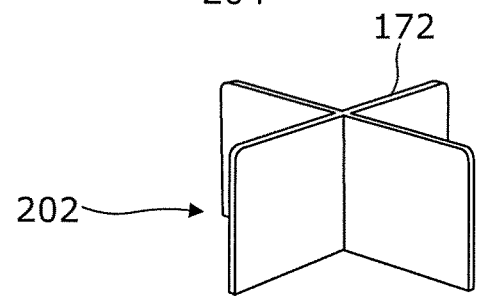
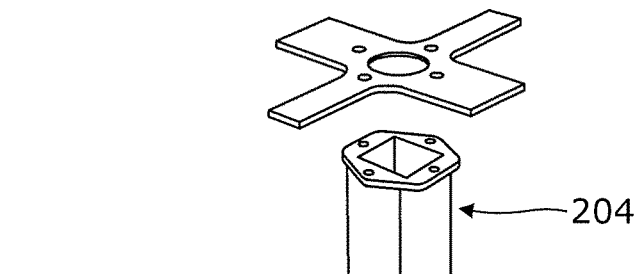
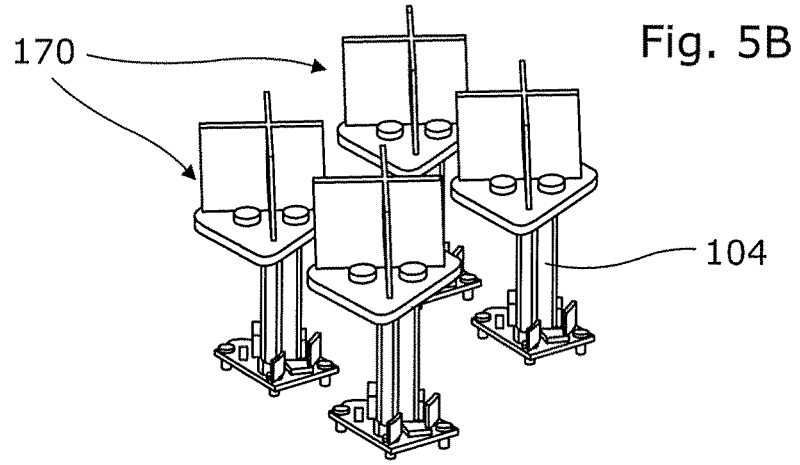
Fig. 5B

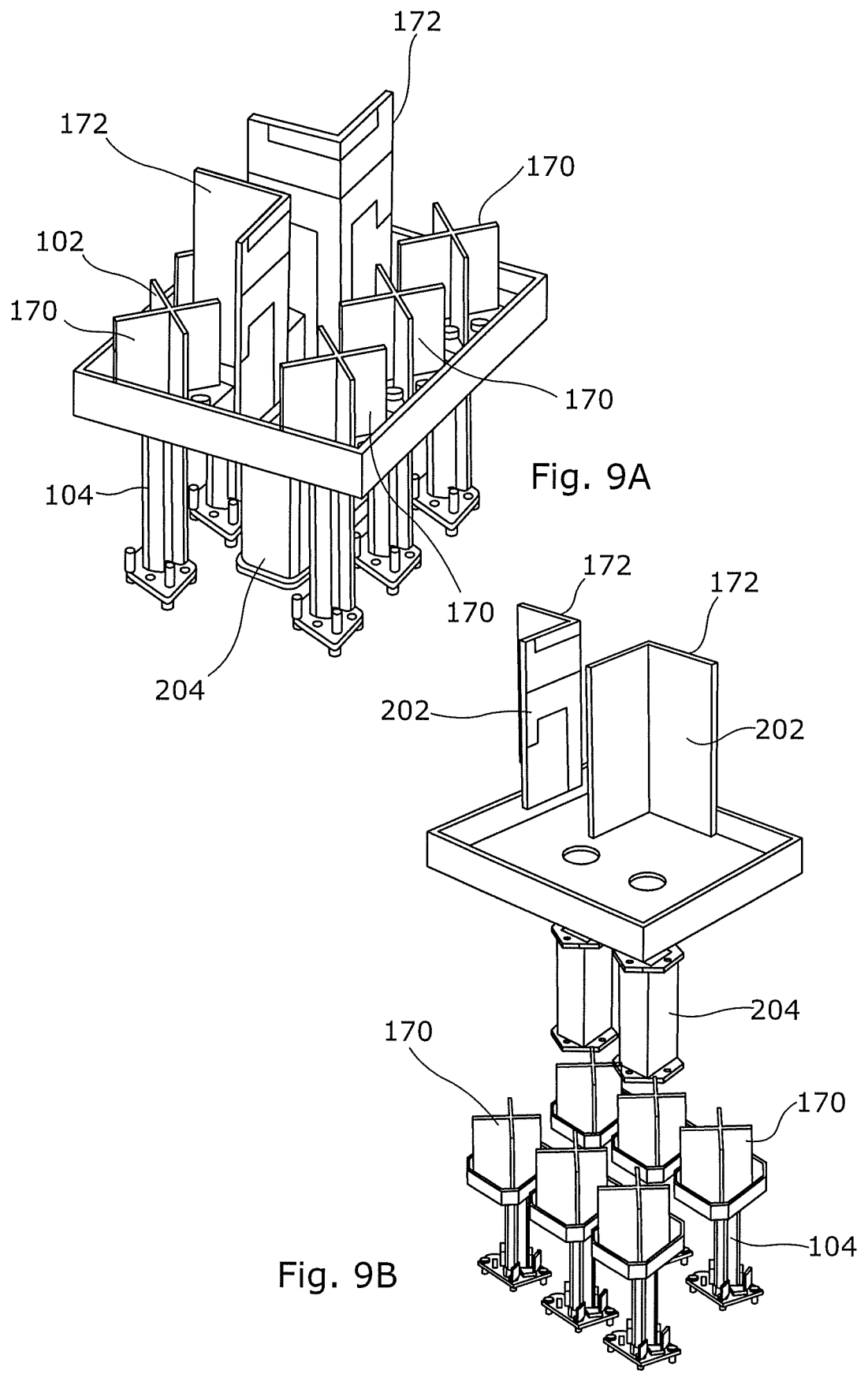

ANTENNA SYSTEM

TECHNOLOGICAL FIELD

Some embodiments of the present disclosure relate to an antenna system.

BACKGROUND

An antenna system is configured to operate in one or more operational frequency bands. The gain of the antenna system is frequency-dependent and is higher within the one or more operational frequency bands than at other adjacent frequencies. The antenna system is therefore configured to transmit and/or receive electromagnetic waves within the one or more operational frequency bands.

BRIEF SUMMARY

According to various, but not necessarily all, embodiments there is provided an antenna system comprising:
a first antenna system comprising first radiator elements that are configured to operate in a first frequency band;
a second antenna system comprising second radiator elements that are configured to operate in a second frequency band;
a third antenna system comprising third radiator elements that are configured to operate in a third frequency band,
wherein one or more first radiator elements are configured to operate with a first polarization in the first frequency band and one or more first radiator elements are configured to operate with a second polarization in the first frequency band, wherein the second polarization in the first frequency band is physically orthogonal to the first polarization in the first frequency band;
wherein one or more second radiator elements are configured to operate with a first polarization in the second frequency band and one or more second radiator elements are configured to operate with a second polarization in the second frequency band, wherein the second polarization in the second frequency band is physically orthogonal to the first polarization in the second frequency band;
wherein one or more third radiator elements are configured to operate with a first polarization in the third frequency band and one or more third radiator elements are configured to operate with a second polarization in the third frequency band, wherein the second polarization in the third frequency band is physically orthogonal to the first polarization in the third frequency band, the antenna system comprising:
means for feeding a first common signal to the radiator elements of one of the second or third antenna systems, with a first phase difference between the radiator elements configured for the first polarization and the radiator elements configured for the second polarization, to create a virtual polarization, wherein the virtual polarization is aligned with one of the first polarization or the second polarization in the first frequency band.

In some but not necessarily all examples, the antenna system comprises means for feeding a first common signal to the radiator elements of said one of the second or third antenna systems, with a first phase difference between the radiator elements configured for the first polarization and the radiator elements configured for the second polarization, to create a first virtual polarization and
comprising means for feeding a second common signal to the radiator elements of the same said one of the second or third antenna systems, with a second phase difference between the radiator elements configured for the first polarization and the radiator elements configured for the second polarization, to create a second virtual polarization.

In some but not necessarily all examples, the first virtual polarization and the second virtual polarization are aligned with the first polarization and the second polarization of the first, antenna system.

In some but not necessarily all examples, the first polarization and the second polarization of the first antenna system are physically misaligned with the first polarization and the second polarization of said one of the second and third antenna systems.

In some but not necessarily all examples, the one or more second radiator elements are configured to operate as a first dipole in the second frequency band and one or more second radiator elements are configured to operate as a second dipole in the second frequency band, wherein the second dipole in the second frequency band is physically orthogonal to the first dipole in the second frequency band.

According to various, but not necessarily all, embodiments there is provided an antenna system comprising:
a first antenna system comprising first radiator elements that are configured to operate in a first frequency band;
a second antenna system comprising second radiator elements that are configured to operate in a second frequency band;
a third antenna system comprising third radiator elements that are configured to operate in a third frequency band,
wherein one or more first radiator elements are configured to operate as a first dipole in the first frequency band and one or more first radiator elements are configured to operate as a second dipole in the first frequency band, wherein the second dipole in the first frequency band is physically orthogonal to the first dipole in the first frequency band;
wherein one or more second radiator elements are configured to operate as a first dipole in the second frequency band and one or more second radiator elements are configured to operate as a second dipole in the second frequency band, wherein the second dipole in the second frequency band is physically orthogonal to the first dipole in the second frequency band;
wherein one or more third radiator elements are configured to operate as a first dipole in the third frequency band and one or more third radiator elements are configured to operate as a second dipole in the third frequency band, wherein the second dipole in the third frequency band is physically orthogonal to the first dipole in the third frequency band, the antenna system comprising:
means for feeding a first common signal to the first dipole and the second dipole of one of the second or third antenna systems, with a first phase difference between the first dipole and the second dipole, to create virtual dipole, wherein the virtual dipole is aligned with one of the first dipole or the second dipole of the first antenna system.

In some, but not necessarily all, examples the antenna system comprises means for feeding a first common signal to the first dipole and the second dipole of said one of the second or third antenna systems, with a first phase difference between the first dipole and the second dipole, to create a first virtual dipole and
comprises means for feeding a second common signal to the first dipole and the second dipole of the same said one of the second or third antenna systems, with a second phase difference between the first dipole and the second dipole, to create a second virtual dipole.

In some, but not necessarily all, examples the first virtual dipole and the second virtual dipole are aligned with the first dipole and the second dipole of the first, antenna system.

In some, but not necessarily all, examples the first dipoles and the second dipoles of the first antenna systems are physically misaligned with the first dipoles and the second dipoles of said one of the second and third antenna systems.

In some, but not necessarily all, examples the physical misalignment is 45°.

In some, but not necessarily all, examples the first radiator elements of the first antenna system are arranged in a first regular two-dimensional pattern comprising a first multiple of first rows, where each first row comprises a plurality of first radiator elements;

the second radiator elements of the second antenna system are arranged in a second regular pattern comprising a second multiple of second rows, wherein each second row comprises at least one second radiator element;

the third radiator elements of the third antenna system are arranged in a third regular pattern comprising a third multiple of third rows, wherein each third row comprises at least one third radiator element;

wherein the first regular two-dimensional pattern, the second regular pattern and the third regular pattern overlap and form a two-dimensional pattern in which the first regular two-dimensional pattern, the second regular pattern and the third regular pattern are interleaved, such that each of the second rows are separated from each other by one or more first rows of the first radiator elements, and each of the third rows are separated from each other by one or more first rows of the first radiator elements.

In some, but not necessarily all, examples the first regular two-dimensional pattern comprises a first plurality of first columns, where each first column comprises a multiple of first radiator elements;

the second regular pattern comprises one or more second columns, wherein each second column comprises at least one second radiator element;

the third regular pattern comprises one or more third plurality of third columns, wherein each third column comprises at least one third radiator element;

wherein the first regular two-dimensional pattern, the second regular pattern and the third regular pattern overlap and form a two-dimensional pattern in which the first regular two-dimensional pattern, the second regular pattern and the third regular pattern are interleaved in two dimensions, such that each of the second rows are separated from each other by one or more first rows of the first radiator elements, each of the third rows are separated from each other by one or more first rows of the first radiator elements.

each of the second columns are separated from each other by one or more first columns of the first radiator elements, and each of the third columns are separated from each other by one or more first columns of the first radiator elements.

In some, but not necessarily all, examples the antenna system comprises first interstices extending, parallel to a first direction, between first radiator elements;

second interstices extending, parallel to a second direction that is different to the first direction, between the first radiator elements;

wherein each second radiator occupies at least a part of one of one first interstice and an adjoining part of one of the second interstices; and each third radiator occupies at least a part of one of one first interstice and an adjoining part of one of the second interstices.

In some, but not necessarily all, examples the radiator elements of an antenna system have the same shape and size, and wherein the radiator elements of different antenna systems have different shapes and/or size.

In some, but not necessarily all, examples the radiator elements of each antenna systems comprises conductive straight elements that extend in mutually orthogonal directions, wherein the conductive straight elements of some or all of the antenna systems form one of:

a cross formed from four conductive straight elements;

a box formed from four conductive straight elements;

a T-shape formed from three conductive straight elements; and a L-shape formed from two conductive straight elements In some, but not necessarily all, examples a first array of first groups of first radiator elements, wherein the first radiator elements in each first group are configured for highest frequency operation and configured to lie on different arms of a virtual cross motif inclined at +/−45° to a common axis;

a third array of third groups of third radiator elements, wherein the third radiator elements in each third group are configured for lowest frequency operation and configured to lie on different arms of a virtual box motif with sides inclined at 0° to the common axis, wherein a plurality of first groups of first radiator elements lie within each virtual box; and a second array of second groups of second radiator elements, wherein the second radiator elements in each second group are configured for intermediate frequency operation and configured to lie on at least two different arms of a virtual cross motif inclined at 0° to the common axis, wherein each second group of second radiator elements lie between first groups of first radiator elements that are outside the virtual boxes, wherein there is a greatest density of first groups of radiator elements and a smallest density of third groups of radiator elements. The intermediate frequency is a frequency between the highest frequency and the lowest frequency.

In some, but not necessarily all, examples the first radiating elements are arranged on top of one or more raised platforms. In some, but not necessarily all, examples the first radiating elements are raised by pillars, for example, they are arranged on top of one or more raised pillars.

In some, but not necessarily all, examples the first radiating elements, the second radiating elements and the third radiating elements share a common ground plane and wherein the first radiating elements, the second radiating elements and the third radiating elements are raised relative to the ground plane, which can also be locally raised, so that the first radiating elements, the second radiating elements and the third radiating elements share a common two dimensional plane.

In some, but not necessarily all, examples at least one of the first antenna system, the second antenna system and the third antenna system is an active antenna system, comprising a two-dimensional array of radiator elements and active circuitry configured for digital beam forming.

In some, but not necessarily all, examples a cellular base station comprises the antenna system.

According to various, but not necessarily all, embodiments there is provided an antenna system comprising:

a first antenna system comprising first radiator elements that are configured to operate in a first frequency band;

a second antenna system comprising second radiator elements that are configured to operate in a second frequency band;

a third antenna system comprising third radiator elements that are configured to operate in a third frequency band, wherein the first radiator elements of the first antenna system are arranged in a first regular two-dimensional pattern comprising a first multiple of first rows, where each first row comprises a plurality of first radiator elements;

the second radiator elements of the second antenna system are arranged in a second regular pattern comprising a second multiple of second rows, wherein each second row comprises at least one second radiator element;

the third radiator elements of the third antenna system are arranged in a third regular pattern comprising a third multiple of third rows, wherein each third row comprises at least one third radiator element;

wherein the first regular two-dimensional pattern, the second regular pattern and the third regular pattern overlap and form a two-dimensional pattern in which the first regular two-dimensional pattern, the second regular pattern and the third regular pattern are interleaved, such that each of the second rows are separated from each other by one or more first rows of the first radiator elements, and each of the third rows are separated from each other by one or more first rows of the first radiator elements.

According to various, but not necessarily all, embodiments there is provided an antenna system comprising:

a first antenna system comprising first radiator elements that are configured to operate in a first frequency band;

a second antenna system comprising second radiator elements that are configured to operate in a second frequency band;

a third antenna system comprising third radiator elements that are configured to operate in a third frequency band, wherein first interstices extend between first radiator elements parallel to a first direction; second interstices extend between the first radiator elements parallel to a second direction, different to the first direction;

one or more second radiators occupy at least a part of one of one first interstice and an adjoining part of one of the second interstices; and one or more third radiators occupies at least a part of one of one first interstice and an adjoining part of one of the second interstices According to various, but not necessarily all, embodiments there is provided an antenna system comprising:

a first antenna system comprising a first array of first groups of first radiator elements configured to operate in a first highest frequency band, wherein the first radiator elements in each first group are configured to lie on different arms of a virtual cross motif inclined at +/−45° to a common axis;

a second antenna system comprising a second array of second groups of second radiator elements configured to operate in an intermediate frequency band, wherein the second radiator elements in each second group are configured to lie on at least two different arms of a virtual cross motif inclined at 0° to the common axis, wherein each second group of second radiator elements lie between first groups of first radiator elements; and a third antenna system comprising a third array of third groups of third radiator elements configured to operate in a lowest frequency band, wherein the third radiator elements in each third group are configured to lie on different arms of a virtual box motif inclined at 0° to the common axis, wherein a plurality of first groups of first radiator elements lie within each virtual box.

The intermediate frequency is a frequency between the highest frequency and the lowest frequency.

According to various, but not necessarily all, embodiments there is provided examples as claimed in the appended claims.

BRIEF DESCRIPTION

Some example embodiments will now be described with reference to the accompanying drawings in which:

FIGS. 1A, 1B, 1C show an example embodiment of the subject matter described herein;

FIGS. 2A, 2B show example embodiments of the subject matter described herein;

FIGS. 5A, 5B show example embodiments of the subject matter described herein;

FIGS. 9A, 9B show example embodiments of the subject matter described herein;

DETAILED DESCRIPTION

Figure 1A:
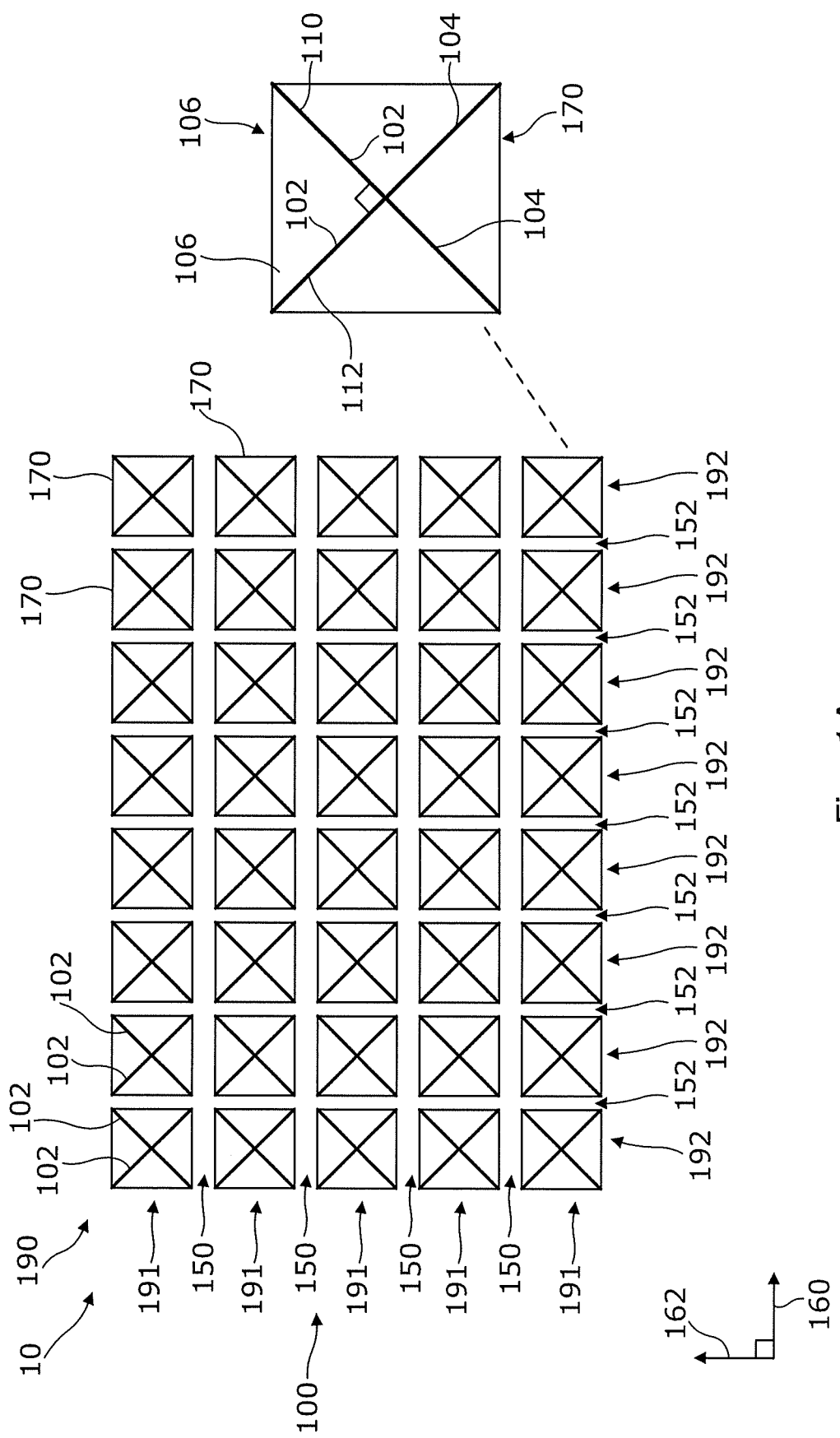

The FIGS. and following description relate to an antenna system 10 comprising:

a first antenna system 100 comprising first radiator elements 102 that are configured to operate in a first frequency band;

a second antenna system 200 comprising second radiator elements 202 that are configured to operate in a second frequency band; and a third antenna system 300 comprising third radiator elements 302 that are configured to operate in a third frequency band.

The system 10 is collectively illustrated in FIGS. 1A, 1B, 1C. FIG. 1 illustrates an example of a first antenna system 100 comprising first radiator elements 102 that are configured to operate in a first frequency band. FIG. 1B illustrates an example of a second antenna system 200 comprising second radiator elements 202 that are configured to operate in a second frequency band. FIG. 1C illustrates an example of a third antenna system 300 comprising third radiator elements 302 that are configured to operate in a third frequency band.

In at least some examples, one or more first radiator elements 102 are configured to operate with a first polarization 110 in the first frequency band and one or more first radiator elements are configured to operate with a second polarization in the first frequency band. The second polarization in the first frequency band is physically orthogonal to the first polarization in the first frequency band.

In at least some examples, one or more second radiator elements 202 are configured to operate with a first polarization in the second frequency band and one or more second radiator elements 202 are configured to operate with a second polarization in the second frequency band. The second polarization in the second frequency band is physically orthogonal to the first polarization in the second frequency band.

In at least some examples, one or more third radiator elements 302 are configured to operate with a first polarization in the third frequency band and one or more third radiator elements 302 are configured to operate with a second polarization the third frequency band. The second polarization in the third frequency band is physically orthogonal to the first polarization in the third frequency band.

The antenna system 10, in this example, comprises a feed 20 configured to feed a first common signal 21 to the radiator elements of one of the second or third antenna systems with a first phase difference between the radiator elements configured for the first polarization and the radiator elements configured for the second polarization. As illustrated in FIG. 2A this creates a virtual polarization, is aligned with one of the first polarization or the second polarization in the first frequency band.

The feed 20 is also configured to feed a second common signal 22 to the radiator elements of the one of the second or third antenna systems with a second phase difference between the radiator elements configured for the first polarization and the radiator elements configured for the second polarization. As illustrated in FIG. 2B this creates a second virtual polarization, which is aligned with the other one of the first polarization or the second polarization in the first frequency band.

In at least some examples, one or more first radiator elements 102 are configured to operate as a first dipole 110 defining a first polarization in the first frequency band and one or more first radiator elements 102 are configured to operate as a second dipole 112 defining a second polarization in the first frequency band. The second dipole 112 in the first frequency band is physically orthogonal to the first dipole 110 in the first frequency band.

In at least some examples, one or more second radiator elements 202 are configured to operate as a first dipole 210 defining a first polarization in the second frequency band and one or more second radiator elements 202 are configured to operate as a second dipole 212 defining a second polarization in the second frequency band. The second dipole 212 in the second frequency band is physically orthogonal to the first dipole 210 in the second frequency band.

In at least some examples, one or more third radiator elements 302 are configured to operate as a first dipole 310 defining a first polarization in the third frequency band and one or more third radiator elements 302 are configured to operate as a second dipole 312 defining a second polarization in the third frequency band. The second dipole 312 in the third frequency band is physically orthogonal to the first dipole in the third frequency band. The system 10, in this example, comprises a feed 20 configured to feed a first common signal 21 to the first dipole and the second dipole of the second antenna system 200 with a first phase difference between the first dipole 210 and the second dipole 212. As illustrated in FIG. 2A this creates a virtual dipole 220, which is aligned with the first dipole 110 of the first antenna system 100.

Although the second radiator elements 202 are physically arranged to have a + configuration, they are controlled via feed 20 to be used as a X configuration, the same configuration as the first radiator elements 102.

The feed 20 is also configured to feed a second common signal 22 to the first dipole 210 and the second dipole 212 of the second antenna system 200 with a second phase difference between the first dipole 210 and the second dipole 212. As illustrated in FIG. 2B this creates a second virtual dipole 222, which is aligned with the second dipole 112 of the first antenna system 100.

The first antenna system 100 and the third antenna system 300 will have their own independent feeds (not illustrated).

In other examples, the system 10 can alternatively or additionally comprise a phase-controlled feed configured to feed a first common signal to the first dipole 310 and the second dipole 312 of the third antenna system 300 with a first phase difference between the first dipole 310 and the second dipole 312. This can create a virtual dipole, which is aligned with the first dipole 110 of the first antenna system 100. The feed can also be configured to feed a second common signal to the first dipole 310 and the second dipole 312 of the third antenna system 300 with a second phase difference between the first dipole 310 and the second dipole 312. This can create a second virtual dipole, which is aligned with the second dipole 112 of the first antenna system 100.

In the example illustrated the first dipoles 110 of the first antenna system 100 are each formed from a group comprising a first radiator element 102 or aligned first radiator elements 102. The second dipoles 112 of the first antenna system 100 are each formed from a group comprising a first radiator element 102 or aligned first radiator elements 102.

More generally, let the first polarization/dipole be oriented at an angle $\theta 1$, the second polarization/dipole be oriented at an angle $\theta 2$, the first dipole being fed with $E(t)$ and the second dipole being fed with $E(t+\Delta 1/\omega)$, where E is the Electric field, t is time, $\omega$ is frequency and $\Delta 1$ is the controlled phase difference between the signal applied to the first dipole and the second dipole then, assuming a common origin of the first dipole and the second dipole, the total E field is the vector sum of the E field of the first dipole and the second dipole e.g.

$$E = \frac{1}{2}\{E\exp(j\cdot\omega\cdot t)\cdot\exp(j\cdot\theta 1) + E\exp j\cdot(\omega\cdot t + \Delta 1)\exp(j\cdot\theta 2)\}$$
$$= \frac{1}{2}\{E\exp(j\cdot\omega\cdot t)\cdot\exp j\cdot(\theta 2+\theta 1)/2[\exp j(\theta 1-\theta 2)/2 + \exp j(\theta 2-\theta 1)/2\cdot\exp j\cdot\Delta 1]$$
$$= \frac{1}{2}\{E\exp(j\cdot\omega\cdot t)\cdot\exp j\cdot(\theta 2+\theta 1)/2[\exp -j(\theta 2-\theta 1)/2 + \exp j(\theta 2-\theta 1)/2\cdot\exp j\cdot\Delta 1]$$
$$= \{E\exp(j\cdot\omega\cdot t)\cdot\cos((\theta 2-\theta 1)/2)\exp j\cdot(\theta 2+\theta 1)/2(1+\exp j\cdot\Delta 1)$$

$\Delta 1$ can be controlled to maintain a constant direction $\alpha$ of the E field of a virtual dipole, a constant polarization e.g. $\frac{1}{2}$ exp j.$(\theta 2+\theta 1)/2$ (1+exp j. $\Delta 1$)=exp j. $\alpha$ For example, if $\theta 1=0$ and $\theta 2=\pi/2$ measured from a common origin, then $E=\frac{1}{2}.E \exp(j.\omega.t)(1+E \exp(j.\Delta 1+\pi/2)$ If $\Delta 1=0$, $E=\frac{1}{2}$. E exp (j. $\omega$. t).(1+j), $\alpha=\pi/4$ For example, if $\theta 1=\text{Tr}$ and $\theta 2=\pi/2$, then $E=\frac{1}{2}.E \exp(j.\omega.t)(-1+E \exp(j.\Delta 1+\pi/2)$ If $\Delta 1=0$, $E=\frac{1}{2}$. E exp (j. $\omega$. t).(−1+j), $\alpha=3\pi/4$ For example, if $\theta 1=\text{Tr}$ and $\theta 2=-\pi/2$, then $E=\frac{1}{2}.E \exp(j.\omega.t)(-1+E \exp 0.\Delta 1-\pi/2)$ If $\Delta 1=0$, $E=\frac{1}{2}$. E exp (j. $\omega$. t).(−1−j), $\alpha=5\pi/4$ For example, if θ1=0 and θ2=−π/2, then E=½.E exp(j.ω.t)(1+E exp(j.Δ1−π/2)

If Δ1=0, E=½. E exp (j. ω. t).(1−j), α=−π/4

The electric fields formed from different physical arrangements of radiator elements, can be combined, with phase control, to form different virtual polarizations e.g. different virtual dipoles.

The direction of an E field defines a polarization.

In some configurations, the first radiator elements 102 of the first group can share a common origin. In some configurations, the second radiator element 202 of the second group can share a common origin. In some configurations the first radiator elements 102 of the first group and the second radiator elements 202 share a common origin. In some configurations the first radiator elements 102 of the first group and the second radiator elements 202 of the second group do not share a common origin.

Each group of one or more first radiator elements 102 forming a first dipole 110 are adjacent and can in some examples overlap a group of one or more first radiator element(s) 102 forming a second dipole 112.

In some but not necessarily all examples, some or all of the first radiator elements 102 are formed from or comprise a straight conductive element 104. In some examples, other shapes are possible.

In this example the first radiator element(s) 102 of a first dipole 110 are forward-slanted (e.g. / in the plane of the page in the FIG.) and the first radiator element(s) 102 of a second dipole 112 are backward-slanted (e.g. in the plane of the page in the FIG.).

Each group of one or more backward-slanted first radiator elements 102 forming a first dipole 110 and each group of one or more forward-slanted first radiator elements 102 forming a second dipole 112 lie on a rotated cross motif. The forward-slanted first dipole 110 (e.g. /) lies on one or more parallel arms 106 of the rotated cross motif that are each at +45° to the first direction 160 (e.g. 450 anti-clockwise rotation relative the right-pointing horizontal x-direction) and −45° to the second direction 162 (e.g. 45° clockwise rotation relative the up-pointing vertical y-direction). The backward-slanted second dipole 112 (e.g. \) lies on one or more other parallel arms of the same cross motif that are each at −45° to the first direction 160 (e.g. 45° clockwise rotation relative the right-pointing horizontal x-direction) and +135° to the second direction 162 (e.g. 135° clockwise rotation relative the up-pointing vertical y-direction).

In this illustrated example, each group of one or more backward-slanted first radiator elements 102 overlap a group of one or more forward-slanted first radiator elements 102 to form, as a first group 170, a rotated cross (e.g. X). The forward-slanted first dipole 110 form arm(s) 106 of the rotated cross that are each at +45° to the first direction 160 and −45° to the second direction 162. The backward-slanted second dipole 112 form arm(s) 106 of the rotated cross that are each at −45° to the first direction 160 and +45° to the second direction 162. The rotated cross (e.g. X) has its arms 106 aligned at 45° to the first and second directions 160, 162.

In the example illustrated the first dipoles 210 of the second antenna system 200 are each formed from a group comprising a second radiator element 202 or aligned second radiator elements 202. The second dipoles 212 of the second antenna system 200 are each formed from a group comprising a second radiator element 202 or aligned second radiator elements 202.

Each group of one or more second radiator elements 202 forming a first dipole 210 are adjacent and can in some examples overlap a group of one or more second radiator element(s) 202 forming a second dipole 212.

Each second radiator element 202 is formed from a straight conductive element 104.

In this example the second radiator element(s) 202 of a first dipole 210 are horizontal (e.g. _ in the plane of the page in the FIG.) and the second radiator element(s) 202 of a second dipole 212 are vertical (e.g. | in the plane of the page in the FIG.).

Each group of one or more horizontal second radiator elements 202 forming a first dipole 210 and each group of one or more vertical second radiator elements 202 forming a second dipole 212 lie on a non-rotated cross motif. The horizontal first dipole 210 lies on one or more horizontal arms 106 of the cross motif that extend parallel to the first direction 160. The vertical second dipole 212 lies on one or more vertical arms 106 of the same cross motif and are parallel to the second direction 162.

In this illustrated example, the second radiator element(s) 202 of a first dipole 210 are horizontal (e.g. _ in the plane of the page in the FIG.) and the second radiator element(s) 202 of a second dipole 212 are vertical (e.g. | in the plane of the page in the FIG.). Each group of one or more horizontal second radiator elements 202 overlap a group of one or more vertical second radiator elements 202 to form, as a second group 172, a non-rotated cross (e.g. +). The horizontal first dipole 210 forms arms 106 of the cross that are parallel to the first direction 160. The vertical second dipole 212 forms arm(s) 106 of the rotated cross that are parallel to the second direction 162. The non-rotated cross (e.g. +) has its arms 106 aligned to the first and second directions 160, 162.

The first dipoles 110 and the second dipoles 112 of the first antenna system 100 lie on a rotated cross motif (X). The first dipoles 210 and the second dipoles 212 of the second antenna system 200 lie on a non-rotated cross motif (+). The first dipoles 110 and the second dipoles 112 of the first antenna system 100 are therefore physically misaligned with the first dipoles 210 and the second dipoles 212 of the second antenna system 200. The physical misalignment is a rotation of 45°.

In the example illustrated the first dipoles 310 of the third antenna system 300 are each formed from a group comprising parallel first radiator elements 302. The second dipoles 312 of the third antenna system 300 are each formed from a group comprising parallel first radiator elements 302.

Each group of first radiator elements 302 forming a first dipole 310 are adjacent a group of first radiator element(s) 302 forming a second dipole 312 and form a parallelogram, for example, a square or rectangle.

In some but not necessarily all examples, some or all of the first radiator elements 102 are formed from or comprise a straight conductive element 104. In some examples, other shapes are possible.

In this example the first radiator elements 302 of a first dipole 310 are horizontal (e.g. _ in the plane of the page in the FIG.) and the first radiator element(s) 302 of a second dipole 312 are vertical (e.g. j in the plane of the page in the FIG.).

Each group of parallel horizontal first radiator elements 302 can be adjacent to and also orthogonal to a group of one or more vertical first radiator elements 302 forming a second dipole 312. The horizontal first dipole 310 lies on opposing sides of a rectangle that extend in the first direction 160. The vertical second dipole 312 lies on the other opposing sides of the rectangle that extend in the second direction 162.

In this illustrated example, each group of horizontal first radiator elements 302 are adjacent a group of vertical first radiator elements 302 to form, as a third group 174, a box.

In the described examples, but not necessarily all examples, the radiator elements 102, 202, 302 of a respective antenna system 100, 200, 300 have the same shape and size, and the radiator elements of different antenna systems 100, 200, 300 have different shapes and/or size. For example, all the radiator elements 102 of the first antenna system 100 lie on rotated cross motifs; all the radiator elements 202 of the second antenna system 200 lie on non-rotated cross motifs; all the radiator elements 302 of the third antenna system 300 lie on boxes.

However, although radiator elements 102, 202, 302 of an antenna system are grouped, in the example of FIG. 1A, 1B, 1C, as crosses or boxes, in other examples (e.g. FIGS. 3A-3G) the conductive straight elements 104 of the radiator elements 102, 202, 302 instead form other shapes. The conductive straight elements 104 of the radiator elements 102, 202, 302 of one of the antenna systems 100, 200, 300 can, for example, form one of: a rotationally symmetric cross formed from four conductive straight elements 104; a rectangular or square box formed from four conductive straight elements 104; a T-shape formed from three conductive straight elements 104; and a L-shape formed from two conductive straight elements 104

The cross and the box each has 90° or 180° rotational symmetry. The T-shape and the L-shape do not have rotational symmetry and can, for example, be used at different relative orientations e.g. 0°, 90°, 180°, 270°.

In the examples illustrated, the first radiator elements 102 of the first antenna system 100 are arranged in a first regular two-dimensional pattern 190 comprising a first multiple of first rows 191, where each first row comprises a plurality of first radiator elements 102. There are first interstices 150 extending, parallel to a first direction 160, between first radiator elements 102. There are second interstices 152 extending, parallel to a second direction 162 that is different to the first direction 160, between the first radiator elements 102.

The second radiator elements 202 of the second antenna system 200 are arranged in a second regular pattern 290 comprising a second multiple of second rows 291, wherein each second row comprises at least one second radiator element 202.

The third radiator elements 302 of the third antenna system 300 are arranged in a third regular pattern 390 comprising a third multiple of third rows 391, wherein each third row comprises at least one third radiator element 302.

As illustrated in FIGS. 3A to 3G, at least some of the first radiator elements 102 of the first antenna system 100, the second radiator elements 202 of the second antenna system 200 the third radiator elements 302 of the third antenna system 300, as previously illustrated separately in FIGS. 1A, 1B, 1C, are mutually overlapping and share the same area/volume.

The first regular two-dimensional pattern 190, the second regular pattern 290 and the third regular pattern 390 overlap and form a two-dimensional pattern 60 in which the first regular two-dimensional pattern 190, the second regular pattern 290 and the third regular pattern 390 are interleaved, such that
each of the second rows 291 are separated from each other by one or more first rows 191 of the first radiator elements 102, and
each of the third rows 391 are separated from each other by one or more first rows 191 of the first radiator elements 102.

Nearest neighbor second radiator elements 202 have nearest portions that are separated, in the second direction 162, from each other by one or more first rows 191 of the first radiator elements 102.

Nearest neighbor third radiator elements 302 have nearest portions that are separated, in the second direction 162, from each other by one or more first rows 191 of the first radiator elements 102.

In FIGS. 3A-3F the first regular two-dimensional pattern 190 comprises a first plurality of first columns 192, where each first column comprises a multiple of first radiator elements 102; the second regular pattern 290 comprises one or more second columns 292, wherein each second column comprises at least one second radiator element; and the third regular pattern comprises one or more third plurality of third columns 392, wherein each third column comprises at least one third radiator element. The first regular two-dimensional pattern 190, the second regular pattern 290 and the third regular pattern overlap and form a two-dimensional pattern 60 in which the first regular two-dimensional pattern 190, the second regular pattern 290 and the third regular pattern are interleaved in two dimensions, such that each of the second rows 291 are separated from each other by one or more first rows 191 of the first radiator elements 102, each of the third rows 391 are separated from each other by one or more first rows 191 of the first radiator elements 102 and each of the third columns 392 are separated from each other by one or more first columns 192 of the first radiator elements 102.

Nearest neighbor third radiator elements 302 have nearest portions that are separated, in the second direction 162, from each other by one or more first rows 191 of the first radiator elements 102. Nearest neighbor second radiator elements 202 have nearest portions that are separated, in the second direction 162, from each other by one or more first rows 191 of the first radiator elements 102.

Nearest neighbor third radiator elements 302 have nearest portions that are separated, in the second direction 162, from each other by one or more first columns 192 of the first radiator elements 102.

In FIGS. 3B, 3D, 3E, 3F each of the second columns 292 are separated from each other by one or more first columns 192 of the first radiator elements 102. Nearest neighbor second radiator elements 202 have nearest portions that are separated, in the first direction 160, from each other by one or more first columns 192 of the first radiator elements 102.

In the examples of FIGS. 3A-3G, at least some of the space within a perimeter of the first antenna system 100 that is unused by the first antenna system 100 is used by the second antenna system 200 and the third antenna system 300. The interstices 150, 152 between the first radiator elements 102 are used to house at least some of the second radiator elements 202 and the third radiator elements 302.

First interstices 150 extend parallel to the first direction 160, between first radiator elements 102. Second interstices 152 extend parallel to the second direction 162 between the first radiator elements 102.

Each second radiator element 202 occupies at least a part of one of the first interstices 150 and an adjoining part of one of the second interstices 152. The second group 172 of second radiator elements 202 can, for example, be
a rotationally symmetric cross within the interstices 150, 152 (FIG. 3A, 3B, 3E);
a T-shape within the interstices 150, 152 (FIG. 3C), for example, at different orientations;
a L-shape within the interstices 150, 152 (FIG. 3D, for example at different orientations.

Figure 3A:
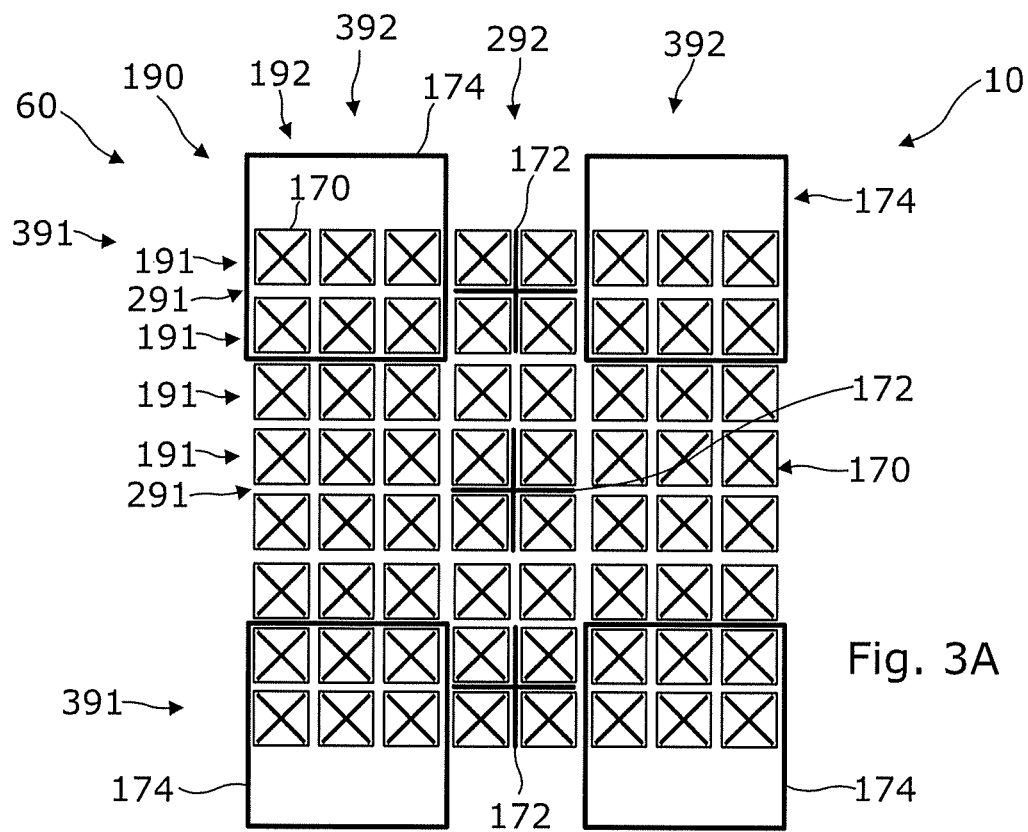
FIGS. 3A-3G show example embodiments of the subject matter described herein.
Figure 3B:
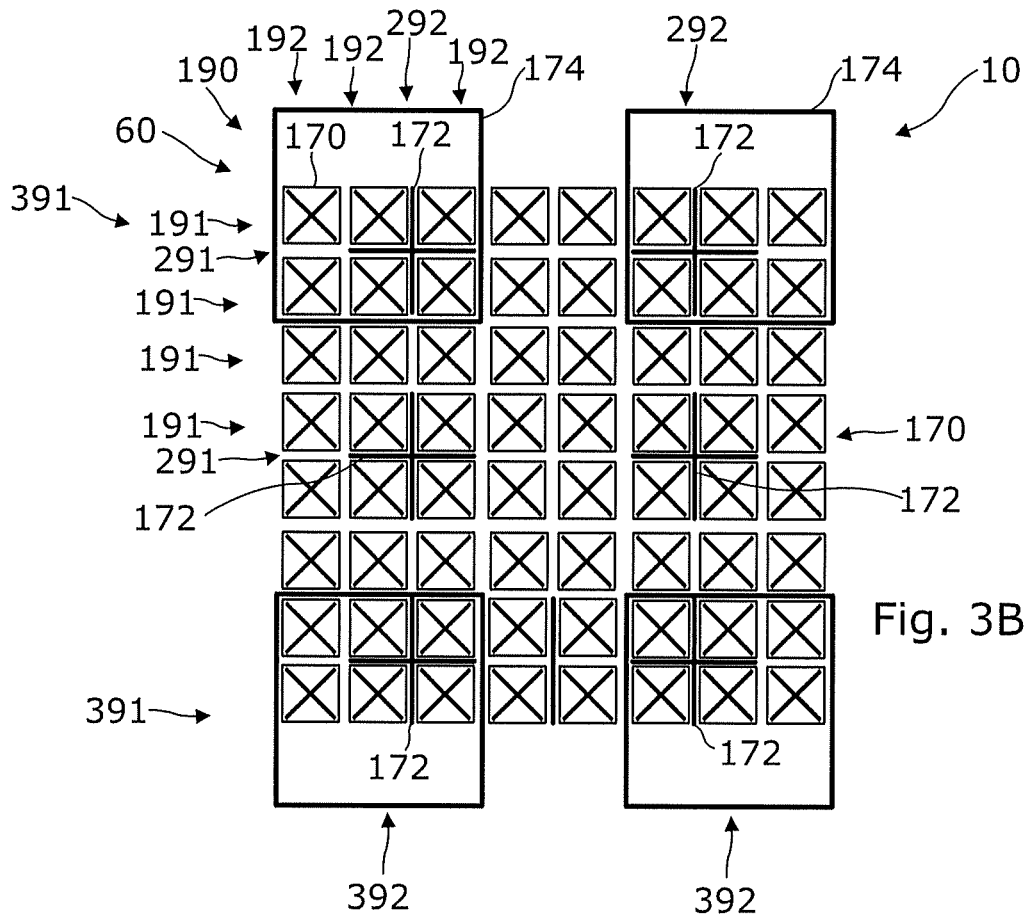
Figure 3C:
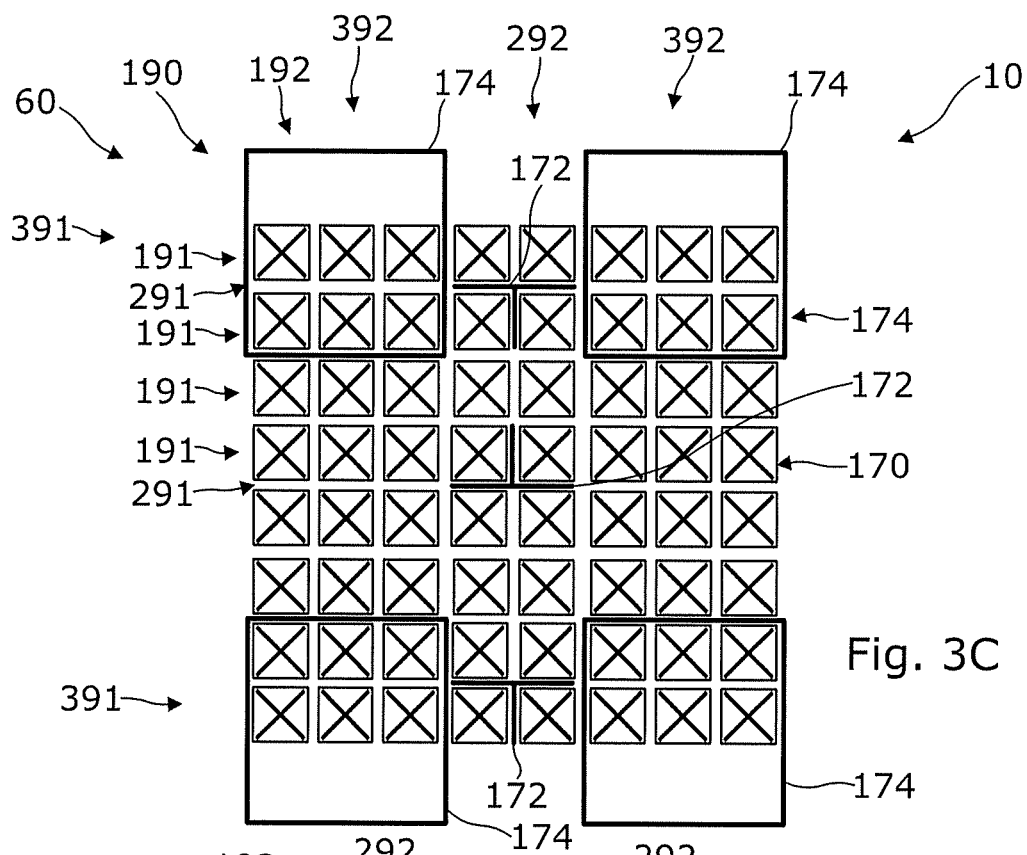
Figure 3D:
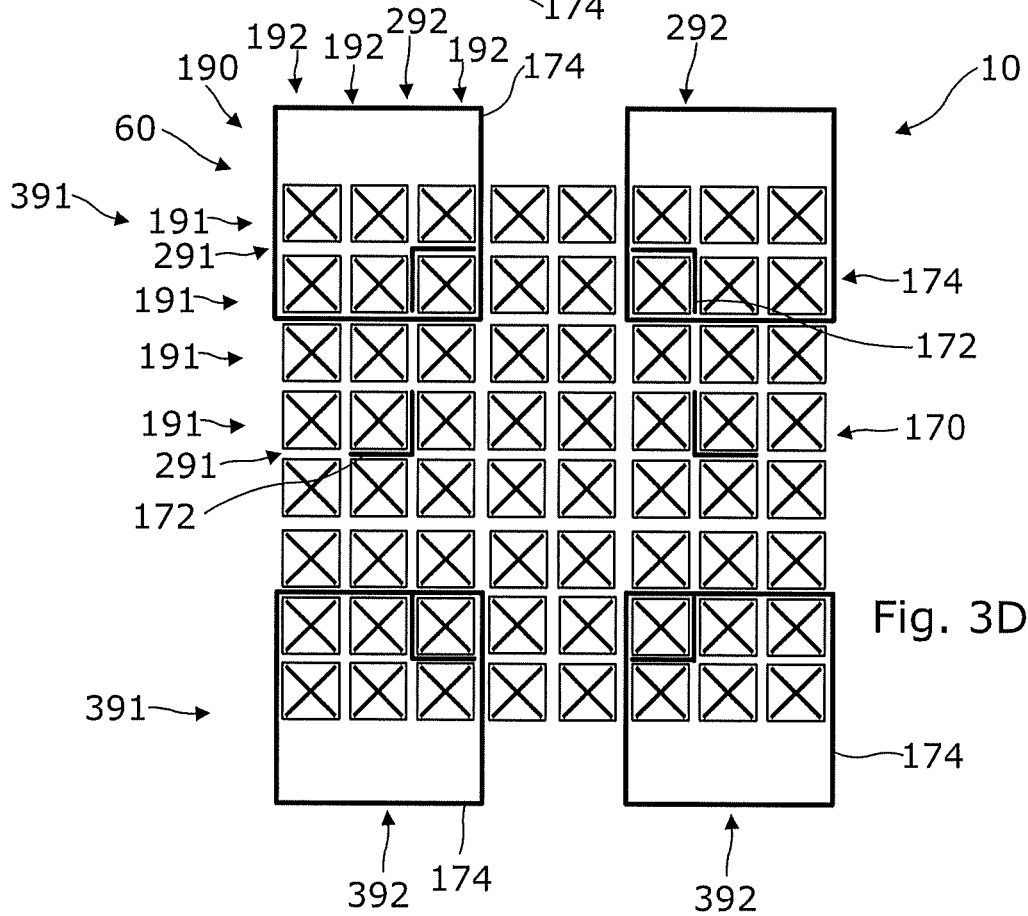
Figure 3E:
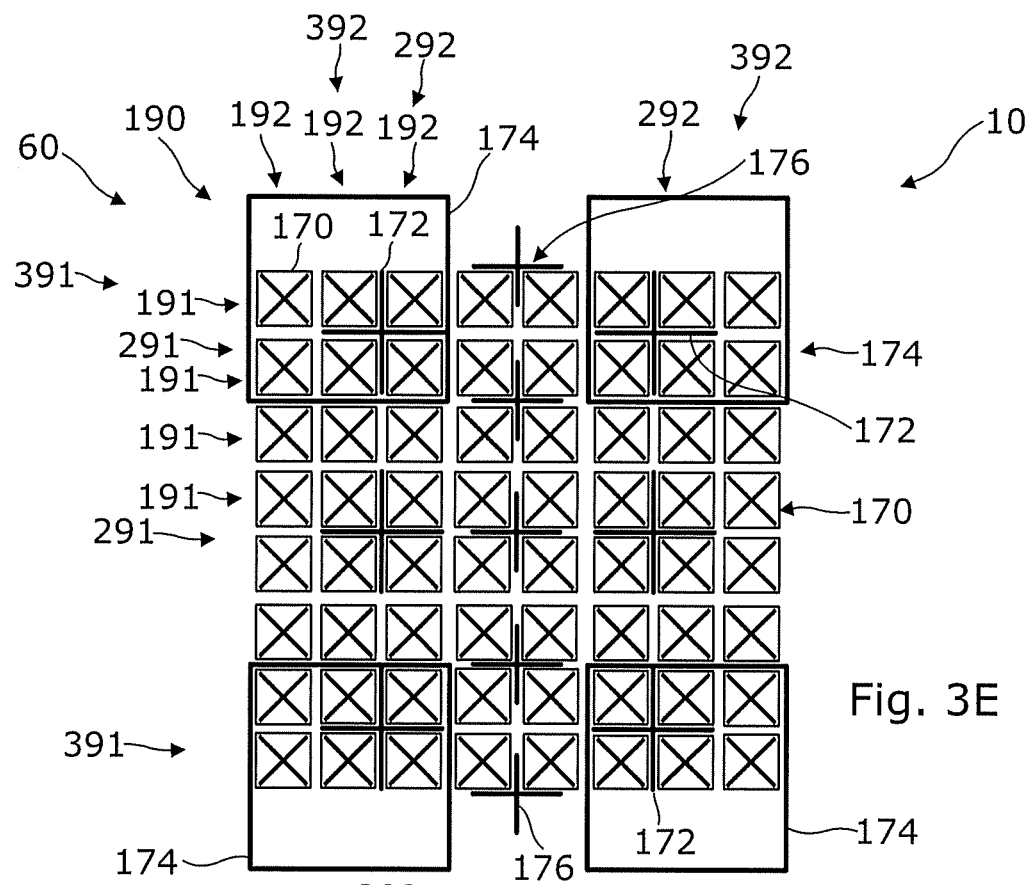
Figure 3F:
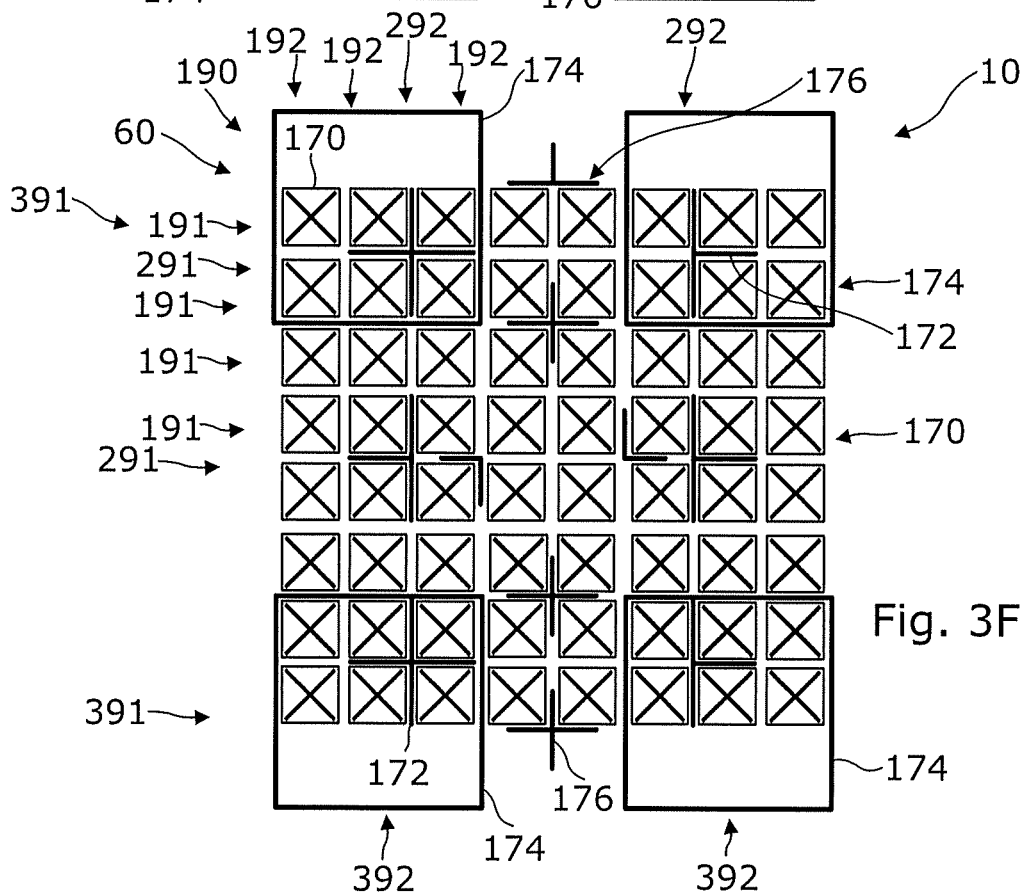
Figure 3G:
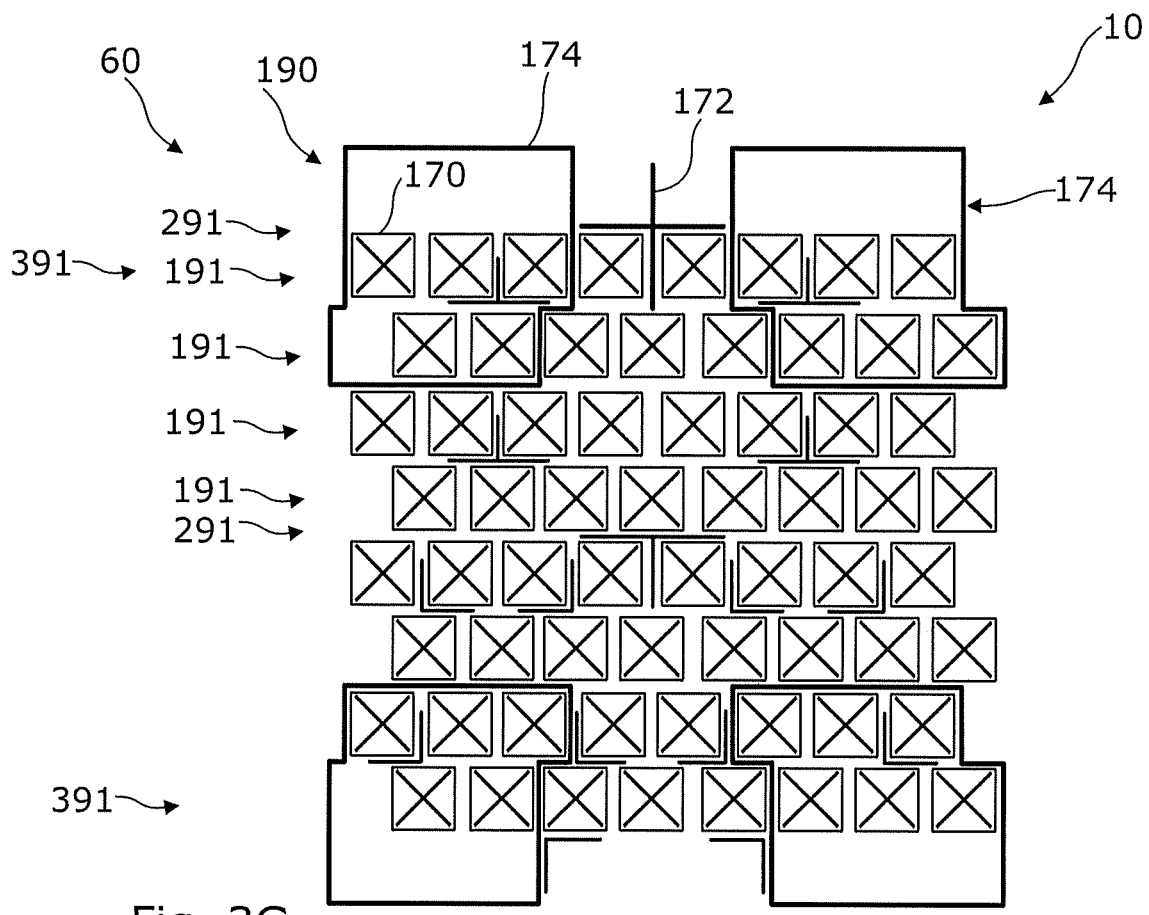

In FIGS. 3F and 3G the second group 172 of second radiator elements 202 are both rotationally symmetric crosses within the interstices 150, 152 and also T-shapes within the interstices 150, 152.

Each third radiator element 302 occupies at least a part of one first interstice 150 and an adjoining part of one of the second interstices 152. The third group 174 of third radiator elements 302 can, for example, be a rectangular or square box within the interstices 150, 152 (FIG. 3A-3F).

Each first group 170 of first radiator elements 102 is configured and sized for highest frequency operation. Each third group 174 of third radiator elements 302 is configured and sized for lowest frequency operation. Each second group 172 of second radiator elements 302 is configured and sized for intermediate frequency operation. The intermediate frequency is a frequency between the highest frequency and the lowest frequency.

The system 10 therefore comprises, in at least some examples, a first array of first groups 170 of first radiator elements 102, wherein the first radiator elements 102 in each first group 170 are configured for highest frequency operation and configured to lie on different arms 106 of a virtual cross motif inclined at +/−45° to a common axis;

a third array of third groups 174 of third radiator elements 302, wherein the third radiator elements 302 in each third group are configured for lowest frequency operation and configured to lie on different sides of a virtual box motif with sides inclined at 0° and 90° to the common axis, and a second array of second groups 172 of second radiator elements 202, wherein the second radiator elements 202 in each second group are configured for intermediate frequency operation and configured to lie on at least two different arms 106 of a virtual cross motif inclined at 0° to the common axis.

The intermediate frequency is a frequency between the highest frequency and the lowest frequency.

In at least some examples, there is a greatest density of first groups 170 of radiator elements and a smallest density of third groups 174 of radiator elements.

A plurality of first groups 170 of first radiator elements 102 lie within each virtual box defined by the third group 174 of third radiator element 302.

In FIG. 3A to 3G some of the second groups 172 of second radiator elements 202 lie between first groups 170 of first radiator elements 102 that are outside the virtual boxes. In FIG. 3B, 3D, 3E, 3F some of the second groups 172 of second radiator elements 202 lie between first groups 170 of first radiator elements 102 that are inside the virtual boxes defined by the third groups 174 of third radiator element 302.

In some examples (FIG. 3A, 3B, 3E), the groups 170, 172, 174 of radiator elements 102, 202, 302 for a particular antenna system 100, 200, 300 form the same shapes with same orientation.

In some examples (FIG. 3C, 3D), the groups 172 of radiator elements 202 for an antenna system 200 form the same shape with different orientation.

In some examples (FIG. 3F, 3G), the groups 172 of radiator elements 202 for an antenna system 200 form different shapes.

In some examples (FIG. 3A, 3B, 3C, 3D, 3E, 3F, 3G), the groups 172 of radiator elements 202 for different antenna systems 100, 200, 300 are different in at least orientation.

In some examples, groups 176 of further radiator elements provide a further antenna system that operates in a frequency band different to the systems 100, 200, 300.

In each of FIGS. 3A to 3G the first antenna system comprises an 8×8 array. In FIGS. 3A to 3F it is a regular array arranged in aligned rows and columns. In FIG. 3G is a non-regular staggered (or interleaved) array with alternate rows aligned in the second direction 162. Each row is alternately staggered from the next row. The overall array is an interleaving of two offset sub-arrays.

The third groups 174 of third radiator elements 302 can be formed from four printed circuit boards arranged as a hollow four-sided parallelepiped, for example an open cube or cuboid shape.

In some examples, each third group 174 of third radiator elements 302 has a length in the first direction 160 of 150 mm, a length in the second direction 162 of 130 mm and a height of 84 mm.

In some examples, each first group 170 of first radiator elements 102 occupies a rectangular area that has a length in the first direction 160 of 32 mm, a length in the second direction 162 of 37 mm and a height of 84 mm. In some examples, each first radiator elements 102 is of height 25 mm and is mounted on a pillar of height 59 mm.

In some examples, each first group 170 of first radiator elements 102 is separated from an adjacent first group 170, in the first direction 160, by first interstices 150 of size 9 mm in the first direction 160. In some examples, each first group 170 of first radiator elements 102 is separated from an adjacent first group 170, in the second direction 162, by second interstices 152 of size 21 mm in the second direction 162.

The first groups 170 of first radiator elements therefore occupy more than 45% of the available area, for example, using the above dimensions approximately $(32*37)/((32+9)*(37+21))*100 \approx 50\%$ of the available area.

In some examples, each second group 172 of second radiator elements 202 forms a cross motif that has total length in the first direction 160 of 72 mm, and a total length in the second direction 162 of 72 mm.

As illustrated in the FIGS. 4A-4F, 5A&5B, 6A & 6B, 7A & 7B, 8A & 8B, 9A & 9B, and 10, the first groups 170 of the first radiating elements 102 can be arranged on top of one or more raised platforms or pillars 104. The first groups 170 of first radiating elements 102 are raised to an appropriate height relative to the second groups 172 of second radiating elements 202 and third groups 174 of third radiating elements 302.

The second groups 172 of the second radiating elements 202 can also be arranged on top of one or more raised platforms or pillars 204.

In some but not necessarily all examples (e.g. FIG. 4B, 4C 4D, 4E, 4F), a ground plane 400 shared in common by the radiating elements 102, 202, 302 can be formed at multiple different levels. The first radiating elements 102, the second radiating elements 202 and/or the third radiating elements 302 can be raised relative to the ground plane 400, which can also be locally raised.

The first radiating elements 102, the second radiating elements 202 and the third radiating elements can have their relative heights controlled such that they share a common two dimensional plane.

Figure 4A:
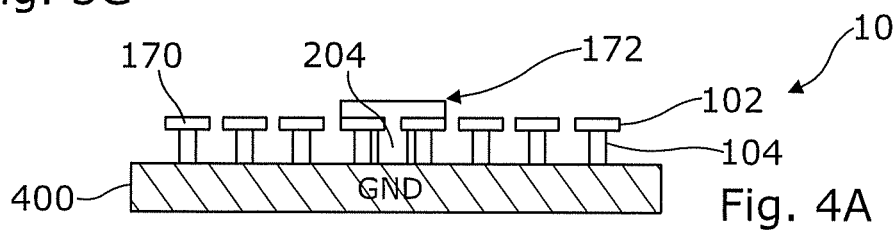
FIGS. 4A-4F show example embodiments of the subject matter described herein.

In FIG. 4A, a second group 172 of second radiating elements 202 is supported by a support pillar 204. The support pillars 104, 204 rise from a common planar ground plane 400.

Figure 4B:
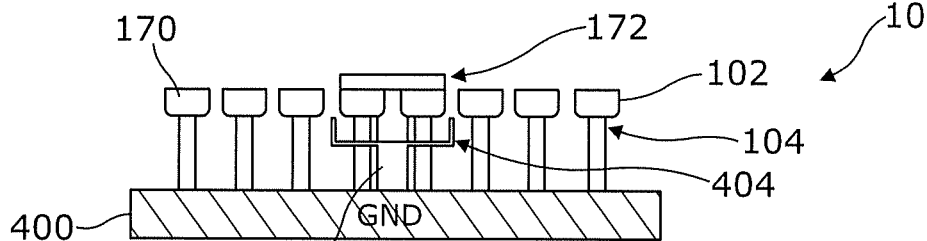
Figure 4C:
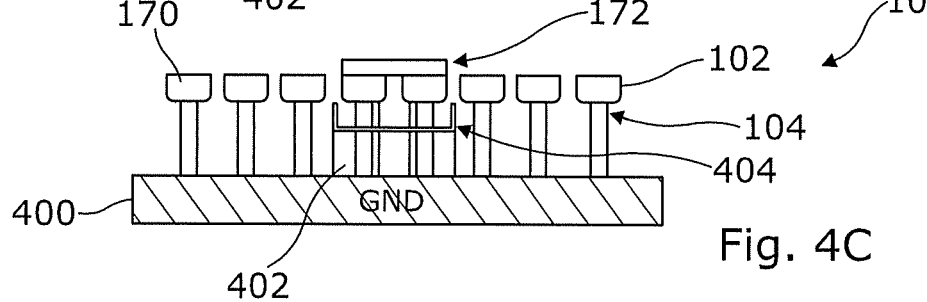
Figure 4D:
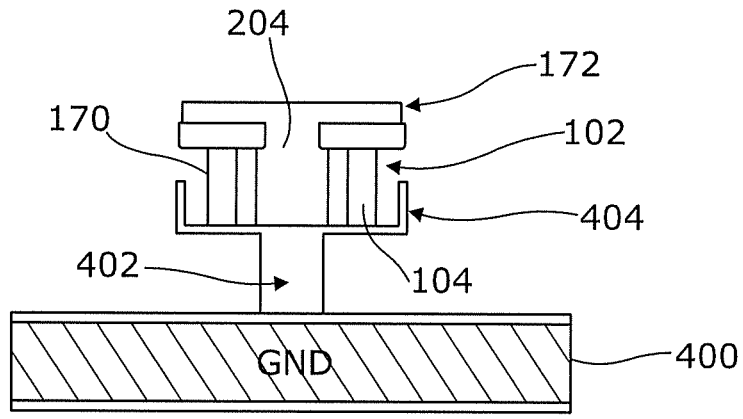
Figure 4E:
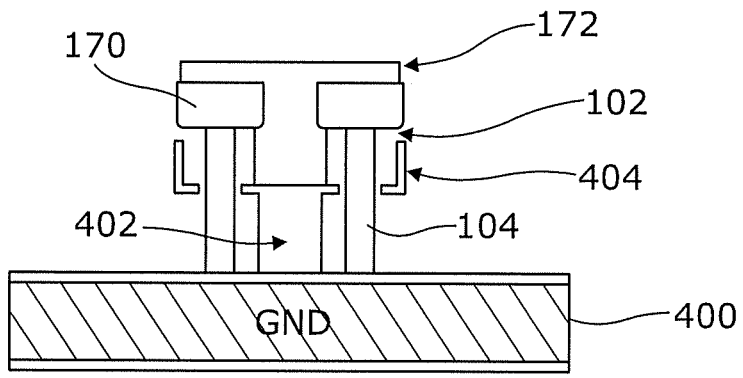
Figure 4F:
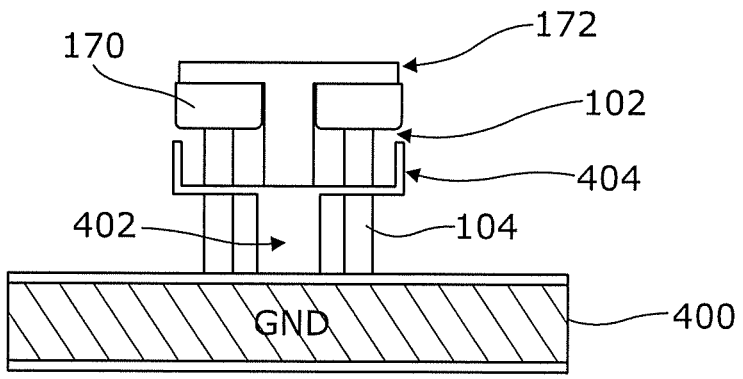

In FIGS. 4B, 4E and 4F a second group 172 of second radiating elements 202 is supported by a support pillar that rises from a raised portion of a common ground plane 400. The raised portion 404 of the ground plane 400 is supported by a single support 402. The supports 104 rise from a lower portion of the common ground plane 400. In FIG. 4E, the supports 104 pass through apertures in the raised portion 404 of the ground plane 400 and do not contact the raised portion 404 of the ground plane 400. In FIG. 4F, the supports 104 pass through apertures in the raised portion 404 of the ground plane 400 and do contact the raised portion 404 of the ground plane 400.

In FIG. 4C, a second group 172 of second radiating elements 202 is supported by a support that rises from a raised portion of a common ground plane 400. The raised portion 404 of the ground plane 400 is supported by multiple supports 402. The supports 104 rise from a lower portion of the common ground plane 400.

In FIG. 4D, a second group 172 of second radiating elements 202 is supported by a support that rises from a raised portion 404 of a common ground plane 400. The supports 104 rise from the raised portion 404 of the common ground plane 400 and are therefore shorter than the examples illustrated in FIGS. 4A-4C. The raised portion 404 of the ground plane is supported by one or more supports 402.

Figure 6A:
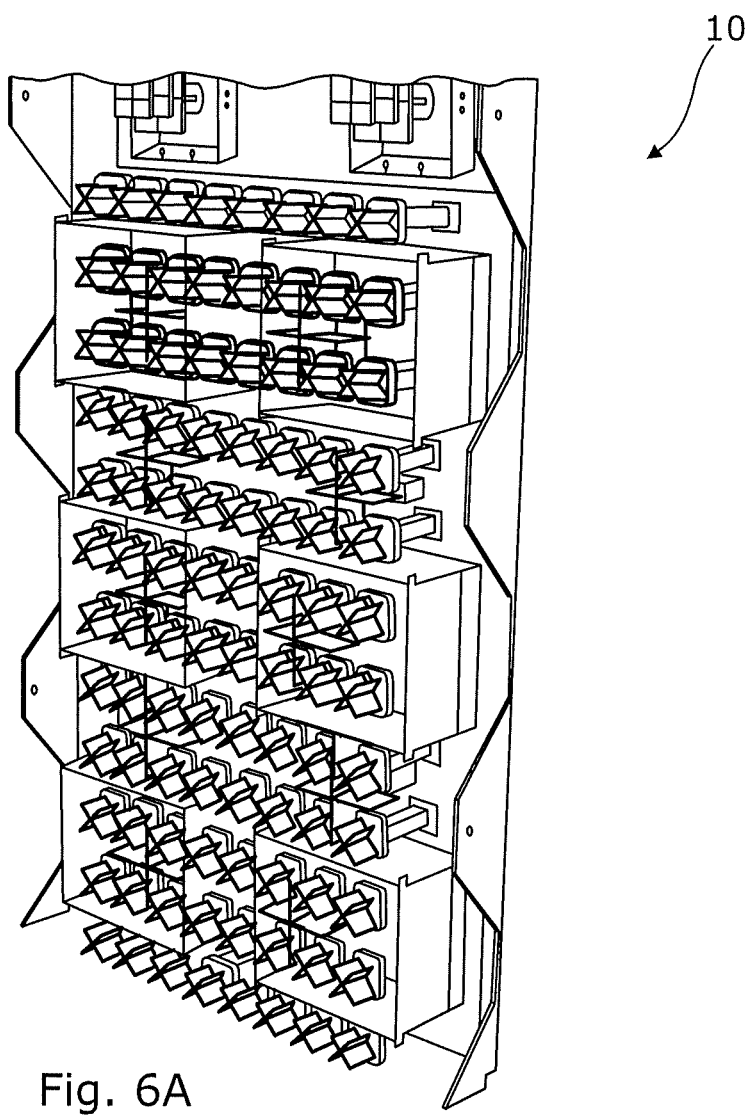
FIGS. 6A, 6B show example embodiments of the subject matter described herein.
Figure 6B:
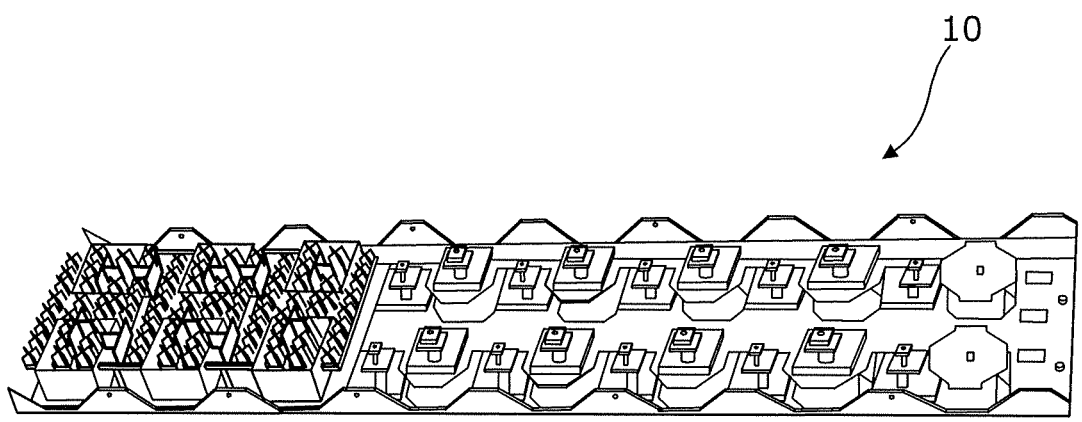

As illustrated in the FIGS. 5A & 5B, each first group 170 of the first radiating elements 102 has a rotated cross-shape and is arranged on top of its own pillar 104. Each second group 172 of the second radiating elements 202 has a non-rotated cross-shape and is arranged on top of its own pillar 204. The complete antenna system 10 is illustrated in FIGS. 6A & 6B.

Figure 7A:
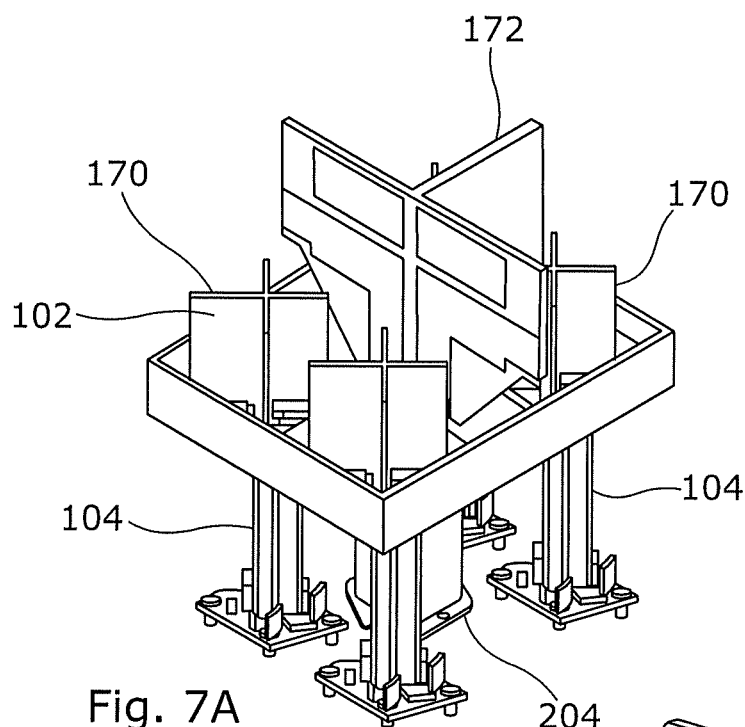
FIGS. 7A, 7B show example embodiments of the subject matter described herein.
Figure 7B:
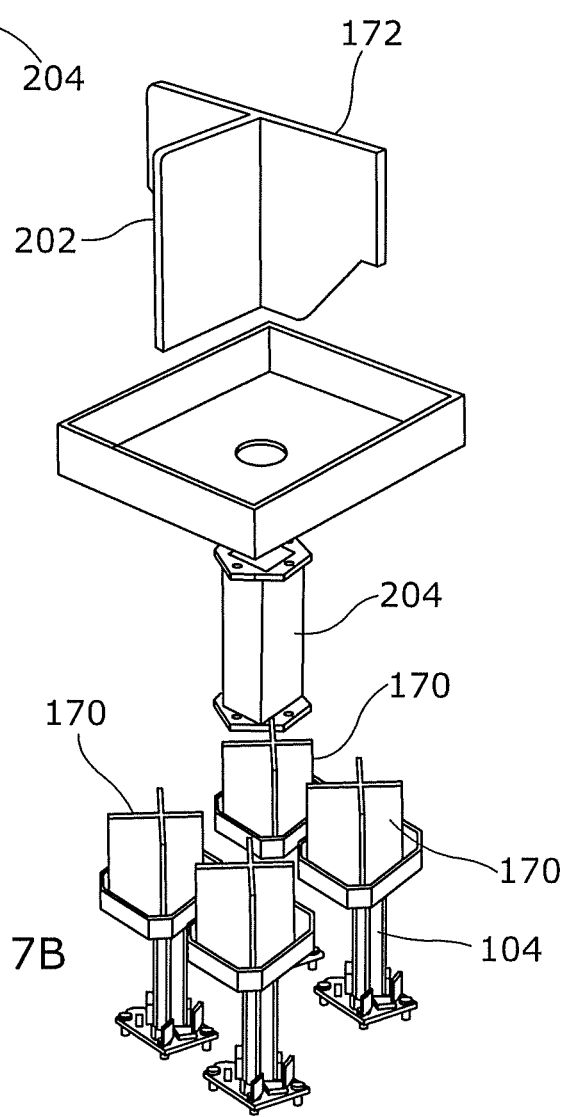
Figure 8A:
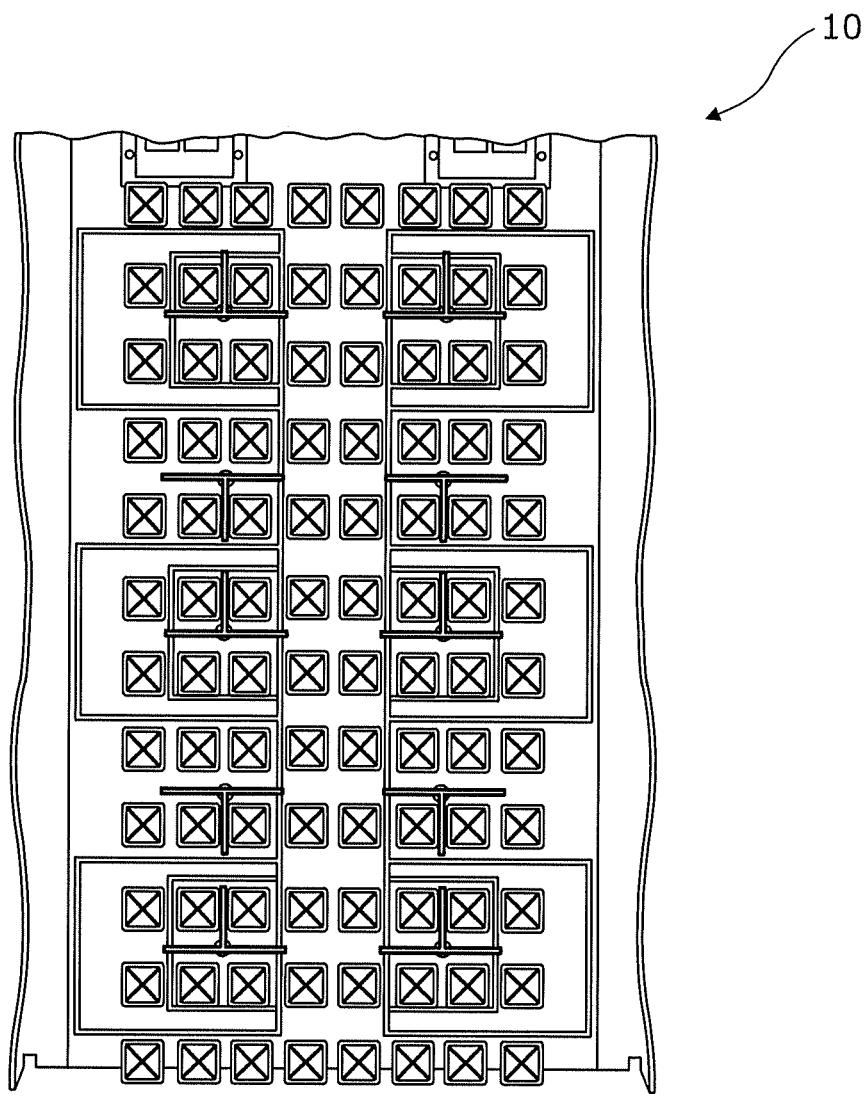
FIGS. 8A, 8B show example embodiments of the subject matter described herein.
Figure 8B:
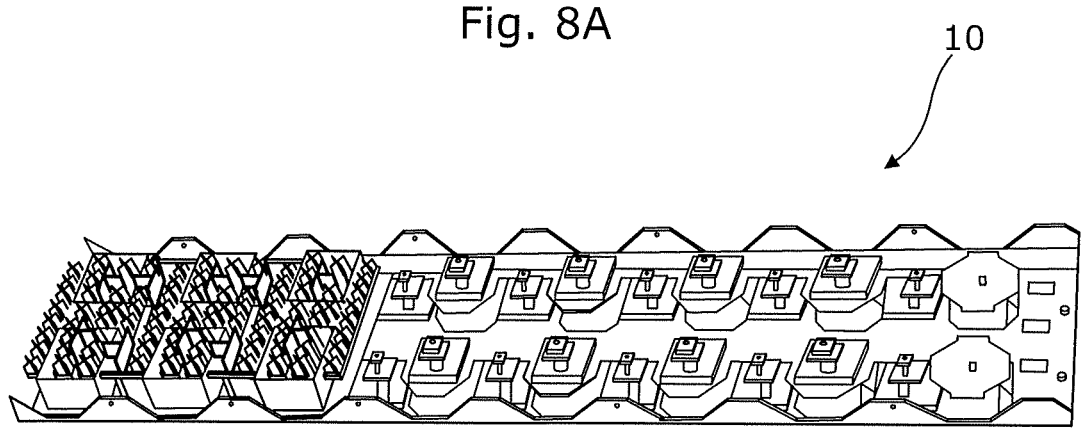

As illustrated in the FIGS. 7A & 7B, each first group 170 of the first radiating elements 102 has a rotated cross-shape and is arranged on top of its own pillar 104. Each second group 172 of the second radiating elements 202 has a T-shape and is arranged on top of its own pillar 204. The complete antenna system 10 is illustrated in FIGS. 8A & 8B.

Figure 10:
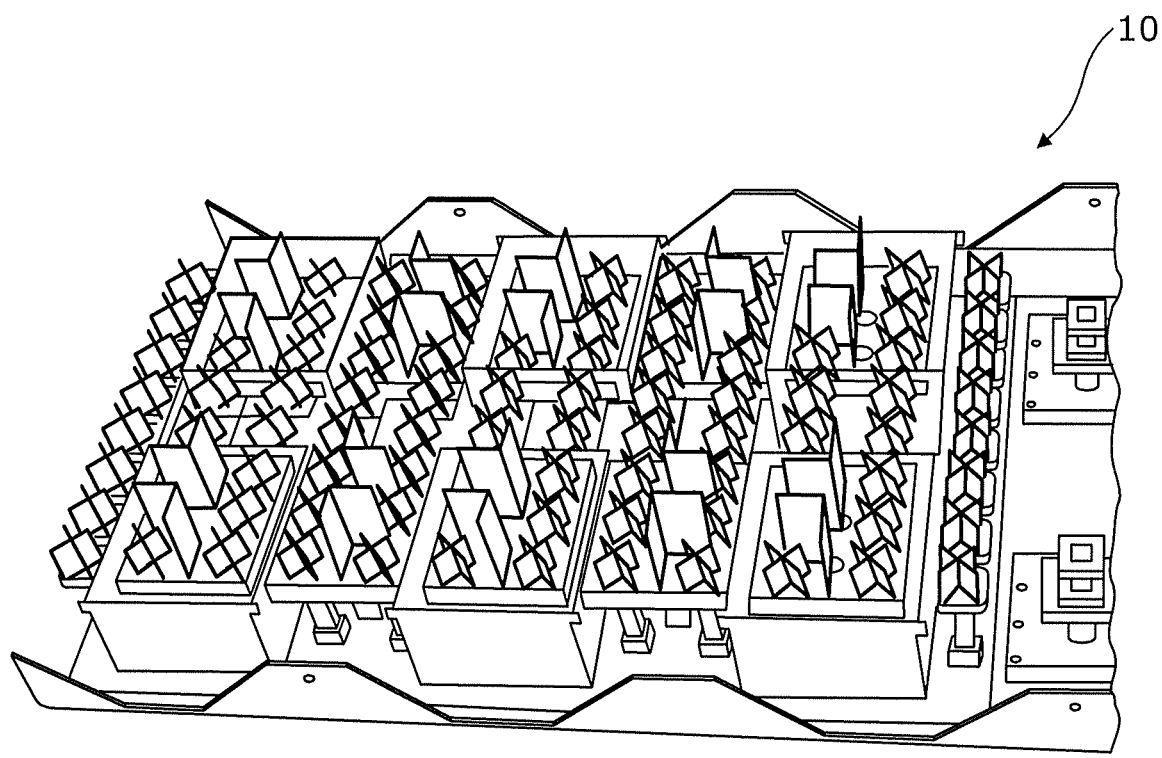
FIG. 10 shows an example embodiment of the subject matter described herein.

As illustrated in the FIGS. 9A & 9B, each first group 170 of the first radiating elements 102 has a rotated cross-shape and is arranged on top of its own pillar 104. Each second group 172 of the second radiating elements 202 has a L-shape and multiple second groups 172 are arranged on top of its own platform/pillar 204. The complete antenna system 10 is illustrated in FIG. 10.

In any of the preceding examples, at least one of the first antenna system 100, the second antenna system 200 and the third antenna system 300 can be an active antenna system, comprising a two-dimensional array of radiator elements and active circuitry configured for digital beam forming. In at least some examples, the two-dimensional array of radiator elements can be a massive multiple-input multiple-output array comprising more than 30 or 60 radiator elements.

Figure 11:
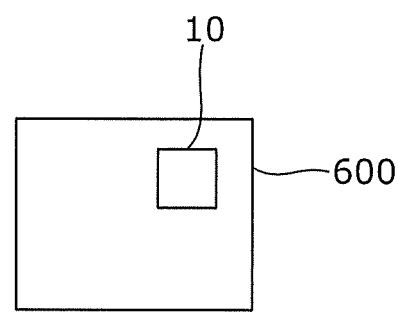
FIG. 11 shows an example embodiment of the subject matter described herein.

FIG. 11 illustrates a cellular base station 600 comprising the antenna system 10 as previously described. The term cellular base station 600 refers to components used for performing some or all of the base station radio access functions. The antenna system can for example be a distributed unit in a split base station architecture. The antenna system 100 can, in some examples, be mounted on a tower or support structure and be separate to other components of the base station 600.

In the preceding examples, the first frequency band, the second frequency band and the third frequency bands are different.

In some examples, but not necessarily all examples the frequencies within the first frequency band are higher than the frequencies within the second frequency band and the third frequency band and the frequencies within the second frequency band are higher than the frequencies within the third frequency band.

In some examples, but not necessarily all examples, the frequencies within some or all of the first, second and third frequency bands do not overlap.

The operational frequency bands may be within or cover a low band (e.g. third frequency band <1 GHz, for example, 0.7 to 0.96 GHz), a very high band (e.g. first frequency band >3 GHz, for example, 3.3 to 3.8 GHz), and a high band (e.g. second frequency band from 1.7 to 2.7 GHz) that is between the low and very high band.

In at least some examples, one or more first radiator elements 102 do not operate as dipoles (defining the first polarization in the first frequency band and the second polarization in the first frequency band); one or more third radiator elements 302 do not operate as dipoles (defining the first polarization in the third frequency band and the second polarization in the third frequency band); and the one or more second radiator elements 202 operate as dipoles 210 (defining the first polarization in the second frequency band and the second polarization in the second frequency band).

The operational frequency bands, for example the first frequency band, the second frequency band and the third frequency band may be within or cover (but are not limited to) Long Term Evolution (LTE) (US) (734 to 746 MHz and 869 to 894 MHz), Long Term Evolution (LTE) (rest of the world) (791 to 821 MHz and 925 to 960 MHz), US-Global system for mobile communications (US-GSM) 850 (824-894 MHz) and 1900 (1850-1990 MHz); European global system for mobile communications (EGSM) 900 (880-960 MHz) and 1800 (1710-1880 MHz); European wideband code division multiple access (EU-WCDMA) 900 (880-960 MHz); personal communications network (PCN/DCS) 1800 (1710-1880 MHz); US wideband code division multiple access (US-WCDMA) 1700 (transmit: 1710 to 1755 MHz, receive: 2110 to 2155 MHz) and 1900 (1850-1990 MHz); wideband code division multiple access (WCDMA) 2100 (transmit: 1920-1980 MHz, receive: 2110-2180 MHz); personal communications service (PCS) 1900 (1850-1990 MHz); time division synchronous code division multiple access (TD-SCDMA) (1900 MHz to 1920 MHz, 2010 MHz to 2025 MHz), ultra wideband (UWB) Lower (3100-4900 MHz); UWB Upper (6000-10600 MHz); DVB-H US (1670-1675 MHz); worldwide interoperability for microwave access (WiMax) (2300-2400 MHz, 2305-2360 MHz, 2496-2690 MHz, 3300-3400 MHz, 3400-3800 MHz, 5250-5875 MHz); radio frequency identification ultra high frequency (RFID UHF) (433 MHz, 865-956 MHz, 2450 MHz) and frequency bands for 5G.

The radio frequency circuitry and the antenna may be configured to operate in a plurality of operational resonant frequency bands. For example, the operational frequency bands may include (but are not limited to):

| | FDD | | TDD |
|---|---|---|---|
| A | 555-806 | A | 2010-2025 |
| B | 694-960 | B | 1930-1990 |
| C | 806-894 | C | 1910-1930 |
| D | 694-862 | D | 2570-2620 |
| E | 790-960 | E | 2300-2400 |
| F | 694-894 | F | 1880-1920 |
| G | 870-960 | G | 2545-2650 |
| H | 694-906 | H | 2500-2690 |
| I | 824-960 | L | 1880-2025 |
| J | 1400-2200 | M | 1880-2690 |

-continued

| | FDD | | TDD |
|---|---|---|---|
| K | 824-894 | Y | 3300-3800 |
| L | 1695-2690 | U | 3400-3600 |
| M | 2300-2690 | Z | 3400-4200 |
| N | 790-862 | | |
| P | 1850-1995 | | |
| Q | 1710-1880 | | |
| R | 1695-2200 | | |
| S | 806-870 | | |
| U | 1920-2170 | | |
| W | 1695-2400 | | |
| Y | 1400-1520 | | |
| Z | 23002400 | | |

The radio frequency circuitry and the antenna may be configured to operate in a plurality of operational resonant frequency bands. For example, the operational frequency bands may include (but are not limited to): the bands specified in the current release of 3GPP TS 36.101.

A frequency band over which an antenna can efficiently operate is a frequency range where the antenna's return loss is less than an operational threshold 64. For example, efficient operation may occur when the antenna's return loss S11 is better than (that is, less than) a threshold such as, for example, −10 dB or −14 dB.

An operational resonant mode (operational bandwidth) of a radiating element may be defined as where the return loss S11 of the radiating element is better than an operational threshold T such as, for example, −10 or −14 dB.

It will be appreciated from the foregoing that in at least some examples there is provided an antenna system 10 comprising:
a first antenna system 100 comprising first radiator elements 102 that are configured to operate in a first frequency band;
a second antenna system 200 comprising second radiator elements 202 that are configured to operate in a second frequency band;
a third antenna system 300 comprising third radiator elements 302 that are configured to operate in a third frequency band,
wherein one or more first radiator elements 102 are configured to operate as a first dipole 110 in the first frequency band and one or more first radiator elements 102 are configured to operate as a second dipole 112 in the first frequency band, wherein the second dipole 112 in the first frequency band is physically orthogonal to the first dipole 110 in the first frequency band;
wherein one or more second radiator elements 202 are configured to operate as a first dipole 210 in the second frequency band and one or more second radiator elements 202 are configured to operate as a second dipole 212 in the second frequency band, wherein the second dipole 212 in the second frequency band is physically orthogonal to the first dipole 210 in the second frequency band;
wherein one or more third radiator elements 302 are configured to operate as a first dipole 310 in the third frequency band and one or more third radiator elements 302 are configured to operate as a second dipole 312 in the third frequency band, wherein the second dipole 312 in the third frequency band is physically orthogonal to the first dipole in the third frequency band, the antenna system 10 comprising: means for feeding a first common signal 21 to the first dipole and the second dipole of one of the second or third antenna system 300s, with a first phase difference between the first dipole and the second dipole, to create a virtual dipole 220, wherein the virtual dipole 220 is aligned with the first dipole or the second dipole of the first antenna system 100.

It will be appreciated from the foregoing that in at least some examples there is provided an antenna system 10 comprising:
a first antenna system 100 comprising first radiator elements 102 that are configured to operate in a first frequency band;
a second antenna system 200 comprising second radiator elements 202 that are configured to operate in a second frequency band;
a third antenna system 300 comprising third radiator elements 302 that are configured to operate in a third frequency band,
wherein the first radiator elements 102 of the first antenna system 100 are arranged in a first regular two-dimensional pattern 190 comprising a first multiple of first rows 191, where each first row comprises a plurality of first radiator elements 102;
the second radiator elements 202 of the second antenna system 200 are arranged in a second regular pattern 290 comprising a second multiple of second rows 291, wherein each second row comprises at least one second radiator element;
the third radiator elements 302 of the third antenna system 300 are arranged in a third regular pattern 390 comprising a third multiple of third rows 391, wherein each third row comprises at least one third radiator element;
wherein the first regular two-dimensional pattern 190, the second regular pattern 290 and the third regular pattern 390 overlap and form a two-dimensional pattern 60 in which the first regular two-dimensional pattern 190, the second regular pattern 290 and the third regular pattern 390 are interleaved, such that
each of the second rows 291 are separated from each other by one or more first rows 191 of the first radiator elements 102, and
each of the third rows 391 are separated from each other by one or more first rows 191 of the first radiator elements 102.

It will be appreciated from the foregoing that in at least some examples there is provided an antenna system 10 comprising:
a first antenna system 100 comprising first radiator elements 102 that are configured to operate in a first frequency band;
a second antenna system 200 comprising second radiator elements 202 that are configured to operate in a second frequency band;
a third antenna system 300 comprising third radiator elements 302 that are configured to operate in a third frequency band,
wherein
first interstices 150 extend between first radiator elements 102 parallel to a first direction 160;
second interstices 152 extend between the first radiator elements 102 parallel to a second direction 162, different to the first direction 160;
one or more second radiator elements 202 occupy at least a part of one first interstice 150 and an adjoining part of one of the second interstices 152; and
one or more third radiator elements 302 occupies at least a part of one of one first interstice 150 and an adjoining part of one of the second interstices 152

It will be appreciated from the foregoing that in at least some examples there is provided an antenna system 10 comprising:
a first antenna system 100 comprising a first array of first groups 170 of first radiator elements 102 configured to operate in a first highest frequency band, wherein the first radiator elements 102 in each first group are configured to lie on different arms 106 of a virtual cross motif inclined at +/−45° to a common axis;

a second antenna system 200 comprising a second array 182 of second groups 172 of second radiator elements 202 configured to operate in an intermediate frequency band, wherein the second radiator elements 202 in each second group are configured to lie on at least two different arms 106 of a virtual cross motif inclined at 0° to the common axis, wherein each second group of second radiator elements 202 lie between first groups 170 of first radiator elements 102; and a third antenna system 300 comprising a third array 184 of third groups 174 of third radiator elements 302 configured to operate in a lowest frequency band, wherein the third radiator elements 302 in each third group are configured to lie on different arms 106 of a virtual box motif inclined at 0° to the common axis, wherein a plurality of first groups 170 of first radiator elements 102 lie within each virtual box. The intermediate frequency is a frequency between the highest frequency and the lowest frequency.

Where a structural feature has been described, it may be replaced by means for performing one or more of the functions of the structural feature whether that function or those functions are explicitly or implicitly described.

The above described examples find application as enabling components of: automotive systems; telecommunication systems; electronic systems including consumer electronic products; distributed computing systems; media systems for generating or rendering media content including audio, visual and audio visual content and mixed, mediated, virtual and/or augmented reality; personal systems including personal health systems or personal fitness systems; navigation systems; user interfaces also known as human machine interfaces; networks including cellular, non-cellular, and optical networks; ad-hoc networks; the internet; the internet of things; virtualized networks; and related software and services.

The term 'comprise' is used in this document with an inclusive not an exclusive meaning. That is any reference to X comprising Y indicates that X may comprise only one Y or may comprise more than one Y. If it is intended to use 'comprise' with an exclusive meaning then it will be made clear in the context by referring to "comprising only one." or by using "consisting".

In this description, reference has been made to various examples. The description of features or functions in relation to an example indicates that those features or functions are present in that example. The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example.

Although embodiments have been described in the preceding paragraphs with reference to various examples, it should be appreciated that modifications to the examples given can be made without departing from the scope of the claims.

Features described in the preceding description may be used in combinations other than the combinations explicitly described above.

Although functions have been described with reference to certain features, those functions may be performable by other features whether described or not.

Although features have been described with reference to certain embodiments, those features may also be present in other embodiments whether described or not.

The term 'a' or 'the' is used in this document with an inclusive not an exclusive meaning. That is any reference to X comprising a/the Y indicates that X may comprise only one Y or may comprise more than one Y unless the context clearly indicates the contrary. If it is intended to use 'a' or 'the' with an exclusive meaning then it will be made clear in the context. In some circumstances the use of 'at least one' or 'one or more' may be used to emphasis an inclusive meaning but the absence of these terms should not be taken to infer and exclusive meaning.

The presence of a feature (or combination of features) in a claim is a reference to that feature) or combination of features) itself and also to features that achieve substantially the same technical effect (equivalent features). The equivalent features include, for example, features that are variants and achieve substantially the same result in substantially the same way. The equivalent features include, for example, features that perform substantially the same function, in substantially the same way to achieve substantially the same result.

In this description, reference has been made to various examples using adjectives or adjectival phrases to describe characteristics of the examples. Such a description of a characteristic in relation to an example indicates that the characteristic is present in some examples exactly as described and is present in other examples substantially as described.

The use of the term 'example' or 'for example' or 'can' or 'may' in the text denotes, whether explicitly stated or not, that such features or functions are present in at least the described example, whether described as an example or not, and that they can be, but are not necessarily, present in some of or all other examples. Thus 'example', 'for example', 'can' or 'may' refers to a particular instance in a class of examples. A property of the instance can be a property of only that instance or a property of the class or a property of a sub-class of the class that includes some but not all of the instances in the class. It is therefore implicitly disclosed that a feature described with reference to one example but not with reference to another example, can where possible be used in that other example as part of a working combination but does not necessarily have to be used in that other example Whilst endeavoring in the foregoing specification to draw attention to those features believed to be of importance it should be understood that the Applicant may seek protection via the claims in respect of any patentable feature or combination of features hereinbefore referred to and/or shown in the drawings whether or not emphasis has been placed thereon.

We claim:

1. An antenna system comprising:
a first antenna system comprising first radiator elements that are configured to operate in a first frequency band;

a second antenna system comprising second radiator elements that are configured to operate in a second frequency band;

a third antenna system comprising third radiator elements that are configured to operate in a third frequency band, wherein the first frequency band, the second frequency band, and the third frequency band are different;

wherein one or more of the first radiator elements are configured to operate with a first polarization in the first frequency band and one or more of the first radiator elements are configured to operate with a second polarization in the first frequency band, wherein the second polarization in the first frequency band is physically orthogonal to the first polarization in the first frequency band;

wherein one or more of the second radiator elements are configured to operate with a first polarization in the second frequency band and one or more of the second radiator elements are configured to operate with a second polarization in the second frequency band, wherein the second polarization in the second frequency band is physically orthogonal to the first polarization in the second frequency band;

wherein one or more of the third radiator elements are configured to operate with a first polarization in the third frequency band and one or more of the third radiator elements are configured to operate with a second polarization in the third frequency band, wherein the second polarization in the third frequency band is physically orthogonal to the first polarization in the third frequency band, the antenna system comprising:

circuitry for feeding a common signal to the radiator elements of one of the second or third antenna systems, with a phase difference between the radiator elements configured for the first polarization and the radiator elements configured for the second polarization, to create a virtual polarization, wherein the virtual polarization is aligned with one of the first polarization or the second polarization in the first frequency band.

2. An antenna system as claimed in claim 1, comprising circuitry for feeding a first common signal to the radiator elements of said one of the second or third antenna systems, with a first phase difference between the radiator elements configured for the first polarization and the radiator elements configured for the second polarization, to create a first virtual polarization and comprising circuitry for feeding a second common signal to the radiator elements of the same said one of the second or third antenna systems, with a second phase difference between the radiator elements configured for the first polarization and the radiator elements configured for the second polarization, to create a second virtual polarization.

3. An antenna system as claimed in claim 2, wherein the first virtual polarization and the second virtual polarization are aligned with the first polarization and the second polarization of the first antenna system.

4. An antenna system as claimed in claim 1, wherein the first polarization and the second polarization of the first antenna system are physically misaligned with the first polarization and the second polarization of said one of the second and third antenna systems.

5. An antenna system as claimed in claim 4, wherein the physical misalignment is 45°.

6. An antenna system as claimed in claim 1,
wherein the first radiator elements of the first antenna system are arranged in a first regular two-dimensional pattern comprising a first multiple of first rows, where each first row comprises a plurality of first radiator elements;
wherein the second radiator elements of the second antenna system are arranged in a second regular pattern comprising a second multiple of second rows, wherein each second row comprises at least one second radiator element;
wherein the third radiator elements of the third antenna system are arranged in a third regular pattern comprising a third multiple of third rows, wherein each third row comprises at least one third radiator element;
wherein the first regular two-dimensional pattern, the second regular pattern and the third regular pattern overlap and form a two-dimensional pattern in which the first regular two-dimensional pattern, the second regular pattern and the third regular pattern are interleaved, such that each of the second rows are separated from each other by one or more first rows of the first radiator elements, and each of the third rows are separated from each other by one or more first rows of the first radiator elements.

7. An antenna system as claimed in claim 6,
wherein the first regular two-dimensional pattern comprises a first plurality of first columns, where each first column comprises a multiple of first radiator elements;
wherein the second regular pattern comprises one or more second columns, wherein each second column comprises at least one second radiator element;
wherein the third regular pattern comprises one or more third plurality of third columns, wherein each third column comprises at least one third radiator element;
wherein the first regular two-dimensional pattern, the second regular pattern and the third regular pattern overlap and form a two-dimensional pattern in which the first regular two-dimensional pattern, the second regular pattern and the third regular pattern are interleaved in two dimensions, such that:
each of the second rows are separated from each other by one or more first rows of the first radiator elements,
each of the third rows are separated from each other by one or more first rows of the first radiator elements,
each of the second columns are separated from each other by one or more first columns of the first radiator elements, and
each of the third columns are separated from each other by one or more first columns of the first radiator elements.

8. An antenna system as claimed in claim 1, comprising:
first interstices extending, parallel to a first direction, between first radiator elements;
second interstices extending, parallel to a second direction that is different to the first direction, between the first radiator elements;
wherein each second radiator element occupies at least a part of one of one first interstice and an adjoining part of one of the second interstices; and
wherein each third radiator element occupies at least a part of one of one first interstice and an adjoining part of one of the second interstices.

9. An antenna system as claimed in claim 1, wherein the radiator elements of an antenna system have the same shape and size, and wherein the radiator elements of different antenna systems have different shapes and/or size.

10. An antenna system as claimed in claim 1, wherein the radiator elements of each of the first, second and third antenna systems comprise conductive straight elements that extend in mutually orthogonal directions, wherein the conductive straight elements of some or all of the first, second and third antenna systems form one of:
- a cross formed from four conductive straight elements;
- a box formed from four conductive straight elements;
- a T-shape formed from three conductive straight elements; or
- a L-shape formed from two conductive straight elements.

11. An antenna system as claimed in claim 1, comprising:
- a first array of first groups of first radiator elements, wherein the first radiator elements in each first group are configured for highest frequency operation and configured to lie on different arms of a virtual cross motif inclined at +/−45° to a common axis;
- a third array of third groups of third radiator elements, wherein the third radiator elements in each third group are configured for lowest frequency operation and configured to lie on different arms of a virtual box motif with sides inclined at 0° to the common axis, wherein a plurality of first groups of first radiator elements lie within each virtual box; and
- a second array of second groups of second radiator elements, wherein the second radiator elements in each second group are configured for intermediate frequency operation and configured to lie on at least two different arms of a virtual cross motif inclined at 0° to the common axis, wherein each second group of second radiator elements lie between first groups of first radiator elements that are outside the virtual boxes, wherein there is a greatest density of first groups of radiator elements and a smallest density of third groups of radiator elements.

12. An antenna system as claimed in claim 1, wherein the first radiating elements are arranged on top of one or more raised platforms and/or on top of pillars.

13. An antenna system as claimed in claim 1, wherein the first radiating elements, the second radiating elements and the third radiating elements share a common ground plane and wherein the first radiating elements, the second radiating elements and the third radiating elements are raised relative to the ground plane, which can also be locally raised, so that the first radiating elements, the second radiating elements and the third radiating elements share a common two dimensional plane.

14. An antenna system as claimed in claim 1, wherein at least one of the first antenna system, the second antenna system or the third antenna system is an active antenna system, comprising a two-dimensional array of radiator elements and active circuitry configured for digital beam forming.

15. A cellular base station comprising the antenna system as claimed in claim 1.

16. An antenna system comprising:
- a first antenna comprising first radiator elements configured to operate in a first frequency band;
- a second antenna comprising second radiator elements configured to operate in a second frequency band;
- a third antenna comprising third radiator elements configured to operate in a third frequency band, wherein the first frequency band, the second frequency band, and the third frequency band are different;

wherein one or more of the first radiator elements are configured to operate with a first polarization in the first frequency band and one or more of the first radiator elements are configured to operate with a second polarization in the first frequency band, wherein the second polarization in the first frequency band is orthogonal to the first polarization in the first frequency band;

wherein one or more of the second radiator elements are configured to operate with a first polarization in the second frequency band and one or more of the second radiator elements are configured to operate with a second polarization in the second frequency band, wherein the second polarization in the second frequency band is orthogonal to the first polarization in the second frequency band;

wherein one or more of the third radiator elements are configured to operate with a first polarization in the third frequency band and one or more of the third radiator elements are configured to operate with a second polarization in the third frequency band, wherein the second polarization in the third frequency band is orthogonal to the first polarization in the third frequency band, the antenna system further comprising:
- circuitry configured to feed a common signal to the radiator elements of one of the second antenna or the third antenna, with a first phase difference between the radiator elements configured for the first polarization and the radiator elements configured for the second polarization, to create a virtual polarization, wherein the virtual polarization is aligned with one of the first polarization or the second polarization in the first frequency band.

* * * * *